United States Patent
Grubbs et al.

(10) Patent No.: US 9,936,238 B2
(45) Date of Patent: Apr. 3, 2018

(54) SYSTEMS AND METHODS FOR PRODUCTION AND DELIVERY OF LIVE VIDEO

(71) Applicant: Infiniscene, Inc., Chicago, IL (US)

(72) Inventors: Stuart Grubbs, Chicago, IL (US); Daniel Trocchio, Chicago, IL (US); Aaron Hassell, Chicago, IL (US)

(73) Assignee: Infiniscene, Inc., Chicago, IL (US)

( * ) Notice: Subject to any disclaimer, the term of this patent is extended or adjusted under 35 U.S.C. 154(b) by 0 days.

(21) Appl. No.: 15/471,966

(22) Filed: Mar. 28, 2017

(65) Prior Publication Data

US 2018/0035145 A1 Feb. 1, 2018

Related U.S. Application Data

(60) Provisional application No. 62/368,825, filed on Jul. 29, 2016.

(51) Int. Cl.
| | |
|---|---|
| *H04N 7/173* | (2011.01) |
| *H04N 21/258* | (2011.01) |
| *H04L 29/06* | (2006.01) |
| *H04N 21/2187* | (2011.01) |
| *H04N 21/2662* | (2011.01) |
| *H04N 21/2343* | (2011.01) |
| *H04N 21/6334* | (2011.01) |
| *H04N 21/254* | (2011.01) |
| *H04L 29/08* | (2006.01) |

(52) U.S. Cl.
CPC ... *H04N 21/25875* (2013.01); *H04L 65/4076* (2013.01); *H04L 65/602* (2013.01); *H04L 65/608* (2013.01); *H04N 21/2187* (2013.01); *H04N 21/2343* (2013.01); *H04N 21/2541* (2013.01); *H04N 21/2662* (2013.01); *H04N 21/6334* (2013.01); *H04L 67/10* (2013.01)

(58) Field of Classification Search
USPC .................................................. 725/74–104
See application file for complete search history.

(56) References Cited

U.S. PATENT DOCUMENTS

| 8,767,081 B2 * | 7/2014 | Kaheel | H04N 5/272 348/207.1 |
|---|---|---|---|
| 9,654,732 B2 * | 5/2017 | Block | H04N 7/152 |
| 9,681,094 B1 * | 6/2017 | Faulkner | H04N 7/14 |

(Continued)

*Primary Examiner* — Mushfikh Alam
(74) *Attorney, Agent, or Firm* — Jeffrey Schox

(57) ABSTRACT

Systems and methods for video production. Stream key information for a broadcast ingest server is stored with a platform account. A platform ingest server receives a video stream from a capture module of a user device, and associates the video stream with a video project of the platform account. Responsive to an instruction provided by an editing module authenticated to access the video project, the platform ingest server provides the video stream to the editing module. Responsive to a broadcast instruction, a compositing engine receives the video stream. The compositing engine generates a composite video stream that includes the video stream and data of an asset in accordance with scene information provided an editing module authenticated to access the video project. The compositing engine provides the composite video stream to the broadcast ingest server by using the stream key information.

20 Claims, 19 Drawing Sheets

(56) References Cited

U.S. PATENT DOCUMENTS

| | | | | |
|---|---|---|---|---|
| 2005/0278642 A1* | 12/2005 | Chang | ............... | G06Q 10/06 |
| | | | | 715/751 |
| 2014/0092254 A1* | 4/2014 | Mughal | ............... | G11B 27/031 |
| | | | | 348/158 |
| 2014/0298475 A1* | 10/2014 | Granstrom | ............... | G06F 21/60 |
| | | | | 726/26 |
| 2016/0379324 A1* | 12/2016 | Hantman | ............... | G06Q 40/12 |
| | | | | 705/26.81 |
| 2017/0013032 A1* | 1/2017 | Lakos | ............... | H04L 43/12 |

* cited by examiner

SYSTEMS AND METHODS FOR PRODUCTION AND DELIVERY OF LIVE VIDEO

CROSS REFERENCE TO RELATED APPLICATIONS

This application claims the benefit of U.S. Provisional Application Ser. No. 62/368,825, filed on 29 Jul. 2016, which is incorporated in its entirety by this reference.

TECHNICAL FIELD

The present application relates generally to systems and methods associated with producing and delivering live digital content streams, and more particularly to providing live video production, editing, delivery and streaming via a network.

BACKGROUND

Traditional live video production systems, live video broadcasting systems, and live video streaming and methods often require a user to know and adjust for different bitrates, install codecs, have knowledge of using stream keys, understand and operate ingest servers, and manage software updates. A user of such current systems and methods can have difficulty setting up and using such systems and methods without prior knowledge or training.

DESCRIPTION OF EMBODIMENTS

Figure 1:
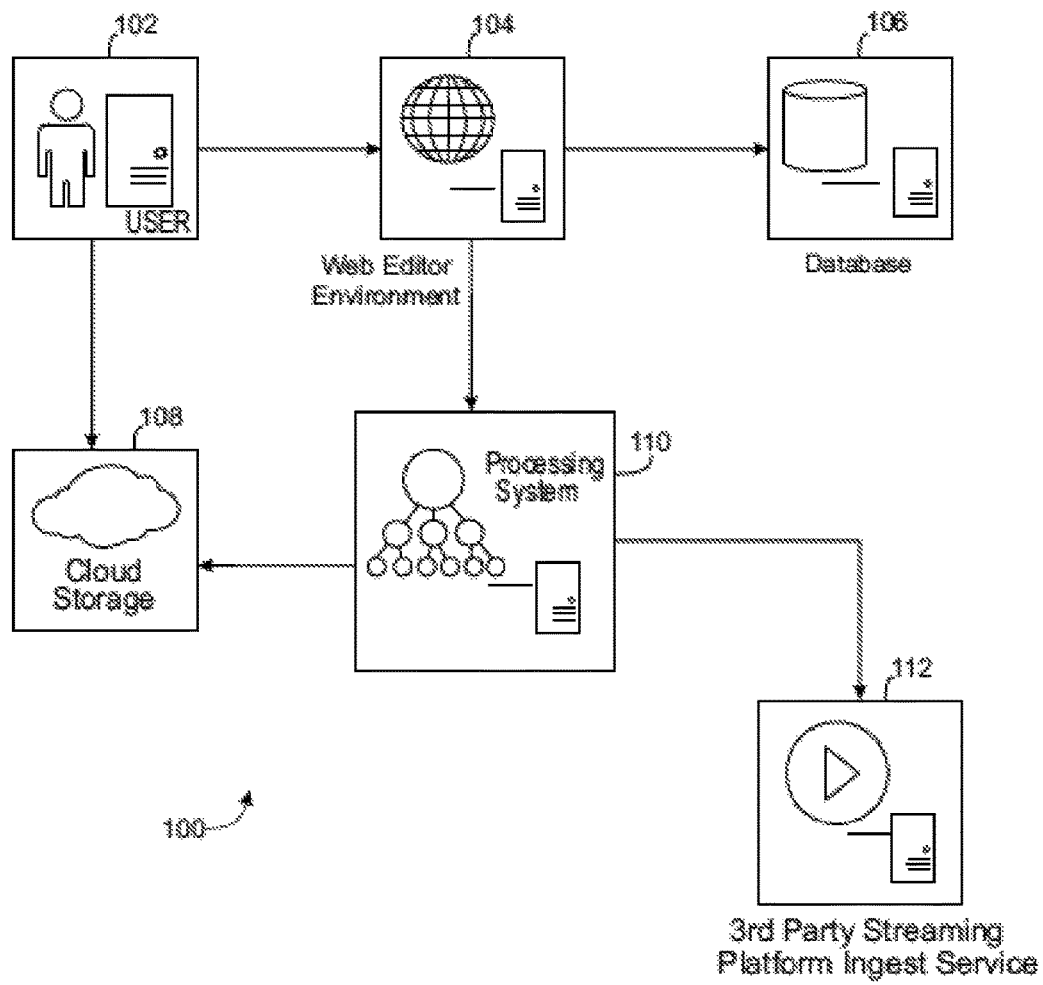
FIG. 1 is a high-level block diagram of an example system for production and delivery of live video and other digital content streams, according to embodiments.

The following description of embodiments is not intended to limit the disclosure to these embodiments, but rather to enable any person skilled in the art to make and use the embodiments disclosed herein.

Overview of Embodiments

For live video streaming over a network, digital media files and streams are typically compressed with predictive differential encoding and are calibrated to synchronize with various other input feeds, such as additional audio, video and other digital content files and streams. Some embodiments herein provide production and broadcasting of live video streams. Some embodiments herein provide seamless video and audio playback of one composite stream that is generated by combining multiple live stream inputs into one composite stream for the delivery and viewing of live digital content. Some embodiments herein provide seamless video and audio playback of one composite stream that is generated by combining multiple input feeds into one composite stream for the delivery and viewing of live digital content.

More specifically, some embodiments herein include live video production systems, methods for live video production, video production platform systems, and methods for video production platform systems. In some embodiments, a live video production system includes at least a first user device (that includes a capture module and a video editing module), a video production ingest server, and a compositing engine. In some embodiments, a video production ingest server and a compositing engine are included in a video production platform system. In some embodiments, a live video production system includes at least a first user device (that includes a first capture module and a first live video editing module), and a second user device (that includes a second capture module and a second live video editing module).

In some embodiments, the compositing engine generates a composite live video stream that includes a first video stream generated by a capture module of the first user device and data of a first asset, in accordance with scene information provided by a live video editing module (sometimes referred to herein as a "video editing module" or "editing module"). In some embodiments, the compositing engine generates a composite live video stream that includes a first video stream generated by a capture module of the first user device and a second video stream generated by a capture module of a second user device.

In some embodiments, the first video stream and the composite live video stream are streams of a first video production project, and the first user device is associated with a first platform account that is authenticated to access the first video production project. In some embodiments, a second user device is associated with a second platform account that is authenticated to access the first video production project. In some embodiments, a user device is associated with the first platform account that is authenticated to access the first video production project.

In some embodiments, the editing module of the first user device is constructed to provide (via the platform system) a start capture instruction to a capture module, a stop capture instruction to a capture module, scene information to the compositing engine for a scene of the first video production project, a live broadcast instruction to the compositing engine to broadcast video of the first video production project, a live update instruction to the compositing engine to update a scene of the first video production project, and an end broadcast instruction to the compositing engine to stop broadcasting video of the first video production project. In some embodiments, the editing module of the second user device is constructed to provide (via the platform system) a start capture instruction to a capture module, a stop capture instruction to a capture module, scene information to the compositing engine for a scene of the first video production project, a live broadcast instruction to the compositing engine to broadcast video of the first video production project, a live update instruction to the compositing engine to update a scene of the first video production project, and an end broadcast instruction to the compositing engine to stop broadcasting video of the first video production project.

By virtue of the foregoing, the first user device and the second user device can collaboratively edit scenes and control broadcasting of a shared video production project.

In some embodiments, a display of the first user device displays a live scene that includes the first video stream (provided indirectly by the ingest server), in accordance with scene information provided by the first editing module. In some embodiments, the platform system provides scene information received by the editing module of the second user device to the editing module of the first user device, and the display of the first user device displays a live scene that includes the first video stream (provided indirectly by the ingest server), in accordance with scene information provided by the first editing module and the scene information provided by the second editing module.

By virtue of the foregoing, a display of the first editing module and a display of the second editing module can display a same scene.

In some embodiments, updated scene information is processed by the compositing engine responsive to reception of a live update instruction received by the compositing engine. In this manner, scene updates performed by an editing module during broadcasting do not update the composite live video stream prior to the live update instruction.

In some embodiments, the editing module of the first user device is constructed to provide a start capture instruction and a stop capture instruction to a capture module of a second user device via the video production platform system.

By virtue of the foregoing, an editing module can capture video from remote devices.

In some embodiments, the compositing engine is constructed to synchronize the first video stream and the second video stream by using time stamps included in metadata of the first video stream and the second video stream.

Description of FIGS. 1-10

Referring now to FIGS. 1-10, exemplary embodiments of systems and methods for improved video production, editing, broadcasting, delivery and live streaming are shown. In these exemplary embodiments, an improved user interface and improved video production, streaming and collaboration can be achieved through a process of providing methods and systems wherein users may create and broadcast live streaming video, which may be embedded with other digital content streams, over a network through use of multiple communicating servers interconnected and be able to edit and composite such live streaming video and other digital content streams simultaneous to their broadcast over a network and to multiple viewers on multiple platforms.

With particular reference to FIG. 1, in one embodiment, the video production and delivery system 100 includes one or more users 102 of a computing system including a web editor environment 104 operated by the user 102 to initiate and/or control the live streaming digital content outputs of user 102 system input devices, such as a microphone, camera, capture card, mobile device, heads-up display, etc. In one example, the system 100 can be implemented on or in connection with a server or servers which receives and hosts the user 102 system's digital content and digital content streams. Aspects of the systems, methods and apparatuses detailed in this description may be one or more machine-executable components embodied within one or more computer readable mediums associated with one or more machines. When executed by one or more of the machines, such components can cause the machines to perform the operations described. The term user 102, when used in this description, can represent one or more users of a computer, computing devices and systems, or mobile or wearable computing devices and systems with which individuals who are users of the systems and methods described herein can be connected to a network, such as the internet or other wire and/or wireless communication networks, local-area networks (LAN), wide-area networks (WAN), cellular networks, etc.

The web editor environment 104, in general, performs a number of functions and operations including requests for live streaming digital content outputs from the user 102 and provides a visual graphical user interface workspace and control panel for the assembly, manipulation and production of live stream broadcasts, including features such as, but not limited to, video broadcast project management, starting a stream, stopping a stream, adding and/or removing digital content streams, digital content assets or users, and switching between broadcast scenes. Manipulation may include, but is not limited to, video and image asset layering, volume control, on-screen text and graphic animation, etc. The user 102, through the web editor environment 104, can perform these functions and operations, and the web editor environment 104 can translate these functions and operations into user digital content stream preferences, general application and user settings, and user-credential related data, all of which are regularly recorded in and retrieved from a database 106.

In another aspect, the user 102, through the web editor environment 104, can define and customize a live streaming project by choosing live streaming digital content stream outputs from user 102 system input devices via the user 102's computing system. By way of example, the cloud storage 108 can operate as a data and communication storage server or a flexible cloud storage service or similar infrastructure configuration. The user 102 may choose to add video, audio, image, text or other digital content assets to be included in a composite live streaming output from a processing system 110. For this digital content to be added to a live streaming project, the web editor environment 104 may prompt the user 102 to upload this digital content to the cloud storage 108, which then may be retrieved by the processing system 110, where ingest and encoding, transcoding and/or compositing of one to multiple live digital content streams can occur.

In another aspect, the user 102, through the web editor environment 104, may send instructions to the processing system 110 for retrieval, reference and/or preview of specific live streaming digital content outputs used in the production of a particular live streaming production project for ingest and transcoding/encoding within the processing system 110.

The output of the processing system 110, which by way of example may be a composite live streaming digital video output from the user 102, customized by using the web editor environment 104 and processed and composited through the processing system 110 to be of a compatible format with the ingest standards of a third-party streaming platform ingest service 112, is then sent to such third-party streaming platform ingest service 112, for example a video viewing platform such as Twitch.tv or YouTube or Facebook, which ingests such composite live streaming digital video and then broadcasts it to a recipient viewer.

By way of example, the processing system 110 can operate as an ingest and encoding system which is responsible for the processing and formatting of the multiple live digital content streams, which by way of example can include changing the bitrate of such a live digital content stream or the transcoding from one protocol such as RTMP to another protocol such as RTP, WebRTC, or other such streaming protocols as would be known to one skilled in the art. Additionally, the processing system 110 can be the recipient of network traffic and act as a preview service of various ingested live digital content streams and digital assets stored in cloud storage 108, instantiating copies of live digital content streams ingested into the processing system 110 and retrieval of digital content assets from cloud storage 108 to respond to calls from the user 102 through the web editor environment 104 for display within the web editor environment 104 and ultimately to the user 102. The broadcasting of a composited live streaming digital video output to the third-party streaming platform ingest service 112 can be accomplished through the user 102 credentialing the processing system 110 for access to their respective account on the third-party streaming platform. Such credentialing occurs through a user login system made available through the web application within the web editor environment 104 with the resultant user credential-related data stored in the database 106 for future retrieval.

Figure 2:
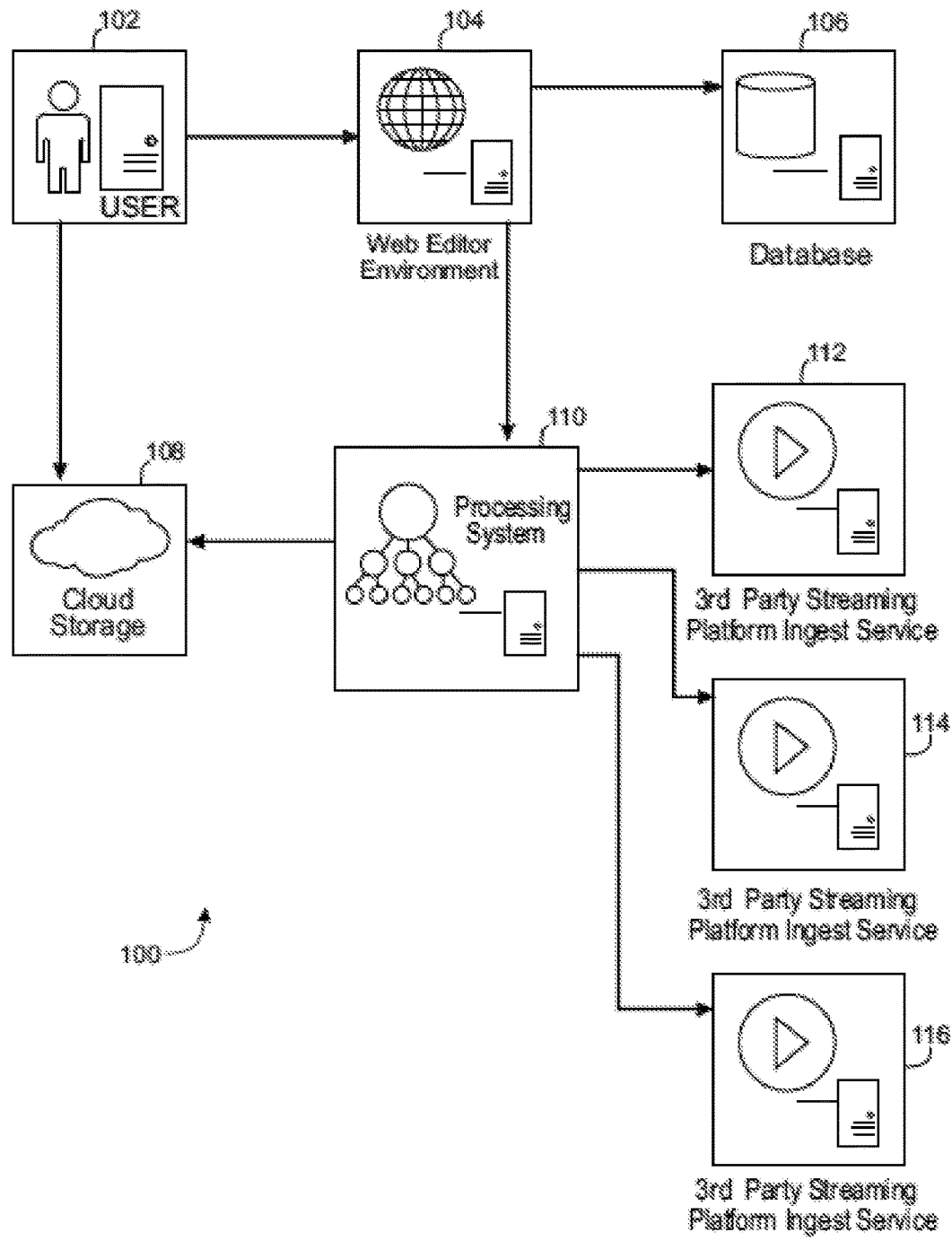
FIG. 2 is a high-level block diagram of the system of FIG. 1 showing detail of additional components and outputs, according to embodiments.

With reference to FIG. 2, the video production and delivery system 100 is shown, with the added functionality to broadcast multiple live digital content streams initiated from instructions from user 102, processed through the web editor environment 104 and the processing system 110 to create a composite live digital content stream which can then be broadcast through to a third-party streaming service 112 and multiple additional third-party streaming services 114 and 116 simultaneously, by non-limiting example. Each of the third-party streaming platform ingest services 112, 114 and 116 can receive the composite live digital content stream as a cloned stream from the output of the processing system 110 transcoded into each of their respective required formats and/or protocols, such that the processing system 110 creates an improved method for simulcast delivery of the composite digital content streams.

The broadcasting of a composited live streaming digital video output to multiple third-party streaming platform ingest services 112, 114 and 116 can be accomplished through the user 102 being credentialed through a user login system existing in a web application in the web editor environment 104 and such user credentials being stored in the database 106, and the processing system 110 using the stored user credentials for access to accounts on respective third-party streaming platforms.

Figure 3:
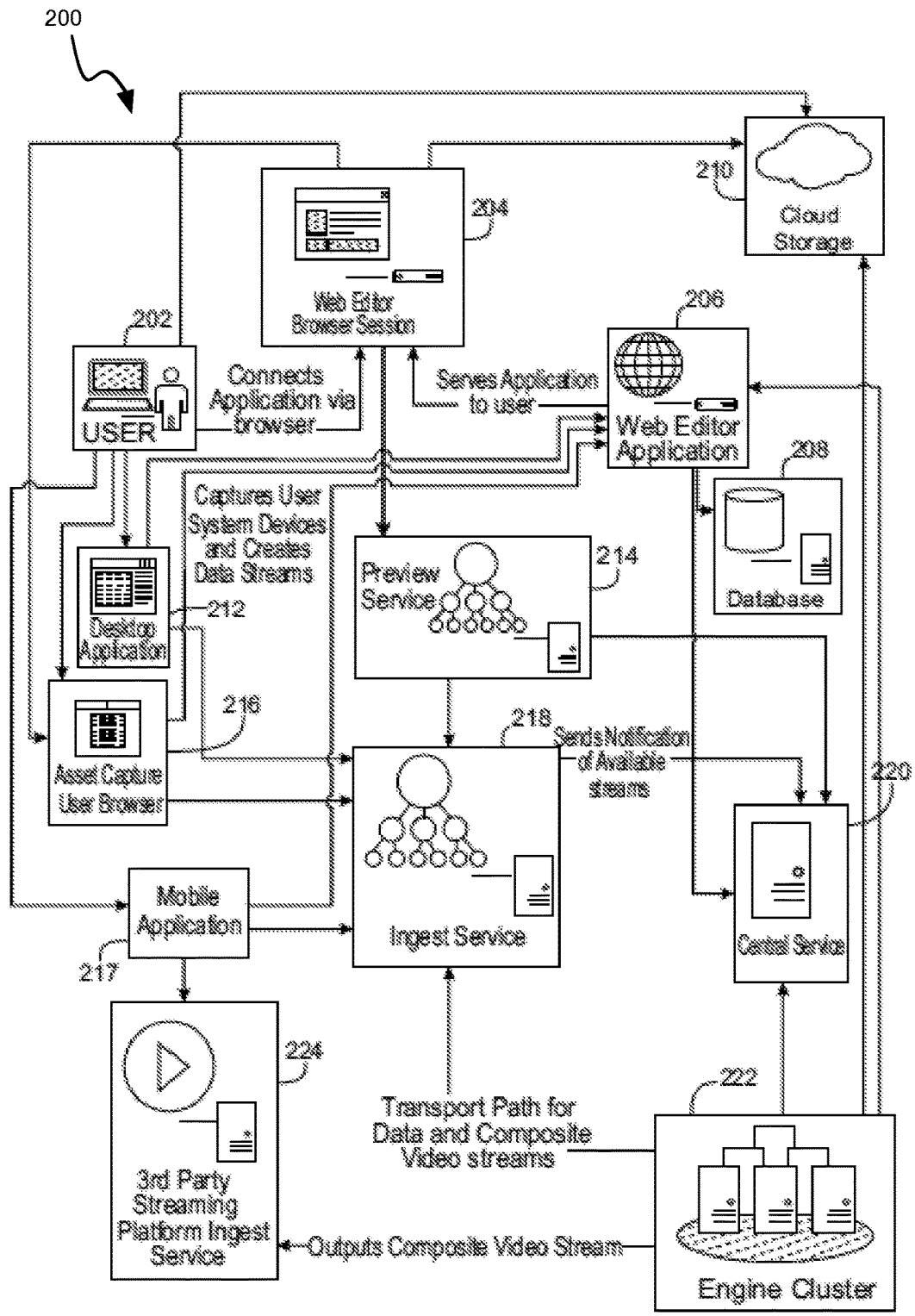
FIG. 3 is a block diagram of an example system for production and delivery of live video and other digital content streams, according to embodiments.

Referring to FIG. 3, an embodiment of a video production and delivery system 200 is shown. As in the system 100, in the system 200, one or more users 202 can connect one or more input devices to the system 200 for accomplishing a live digital content stream broadcast to multiple broadcast platforms with recipients or viewers.

A web editor browser session 204 can be in the form of a graphical user interface (GUI) on a user's 202 machine and may be configured as a website using HTTP or other similar protocol, with which the user 202 interacts to operate the video production and delivery system 200 through the instantiation of a live video production project, through a call to a web editor application 206. Each live video production project, which acts as a recipe for manipulating, initiating and/or controlling any of a multitude of live streaming digital content outputs of the user 202 system input devices such as a microphone, camera, capture card, laptop/desktop screen, mobile device, head-mounted display, etc., and retrieves copies of these live stream digital content outputs from the ingest service 218. The preview service makes the digital content output viewable to the end user via the web editor browser session. In some embodiments, these live stream digital content outputs from the system 200 input devices can be associated and accessed as inputs to a video production project through the web editor application 206 using a multi-factor security check allowing for access of the live digital content stream data for use by the web editor application 206 and the system 200. The web editor application 206 retrieves and stores user settings and information, including stream configurations, web addresses for image and/or text asset retrieval, etc., from or to a database 208, which may be hosted on a standard hardware environment or in a cloud-based storage environment or server platform. Additionally, a cloud storage 210 is contemplated which can store and have retrieved from it multiple digital content assets. In the embodiment shown in FIG. 3, the cloud storage 210 hosts digital content assets, such as images and text and video files, being retrieved for purposes of delivery to a particular video production project by the web editor 204, with instructions directly from the user 202.

A desktop application 212 can be provided, which resides on the user's 202 system, to capture digital content output streams from user 202 system input devices. Within the web editor user browser session 204, the user 202 may request one or more digital content output streams from the desktop application 212. Such digital content output streams are processed through the ingest service 218 and delivered to the web editor browser session 204 via the preview service 214, before a live stream broadcast can occur. The user 202 may instruct the web editor browser session 204 to display a preview of any such digital content output streams delivered via a preview service 214. The preview service 214 communicates with a central service 220 to resolve an input identifier corresponding to such a designated digital content output stream or streams requested by the user 202 through the web editor browser session 204. The preview service 214 then communicates with an ingest service 218 to retrieve a copy of the designated digital content output stream matching the input identifier retrieved from the central service 220, relaying the designated digital content output stream to the web editor browser session 204, so the user 202 can preview the live digital content stream previously selected through the desktop application 212.

In one aspect, the desktop application 212 can be configured to function to deliver one or more digital content output streams from the user 202 system input devices such as microphones, cameras, etc., through an asset capture user browser 216.

In another aspect, a mobile application 217 may be used to capture and provide additional live digital content output streams or further allow the user 202 to control the live digital content output streams. In another aspect, a mobile application 217 may be used to capture and provide additional live digital content output streams or further allow the user 202 to control the live digital content output streams in a manner similar to that described herein for user devices (e.g., the user device 1110 of FIG. 11A). In some embodiments, the mobile application 217 includes a capture module as described herein (e.g., capture module 1111 of FIG. 11A). In some embodiments, the mobile application 217 includes an editing module as described herein (e.g., editing module 1112 of FIG. 11A). Such mobile application 217 could also include a remote control feature on a mobile device which could provide functionality such as the starting/stopping of a digital content output stream of a user 202 system input device, switching between different live streaming scenes on the web editor 204 in the browser, or being able to call or message or otherwise chat with a support team or representative.

The ingest service 218 in one embodiment can capture a live stream via RTMP protocol, RTP, or any other industry-standard protocol or format as should be known to those skilled in the art, and send notifications of available live digital content streams to the central service 220, which may be implemented as a message bus that relays information between various services internal to the system 200, but also stores information temporarily in the in-memory (RAM) datastore. In one aspect, the ingest service 218 communicates with the central service 220 for instructions provided through the web editor application 206 by the user 202 in the web editor browser session 204 and hosts live digital content streams, as chosen by the user 202, for display within a final composite live digital content stream, to communicate with an engine cluster 222. The engine cluster 222 encodes and/or transcodes live digital content streams received from the ingest service 218 into a composite stream by using a standard streaming video codec such as H.264, VP8, VP9, etc., which will be known to one skilled in the art, and may also function to retrieve digital content stored in cloud storage 210 to be used in the final composite digital content stream output from the engine cluster 222. In one aspect, the engine cluster 222 can also be any of a number of known computerized devices which includes one or more processors, memory, storage and programming instructions which may be in the form of an application. The composite stream is optimally output to a third-party streaming platform 224 for receipt by one or multiple viewers.

Figure 4:
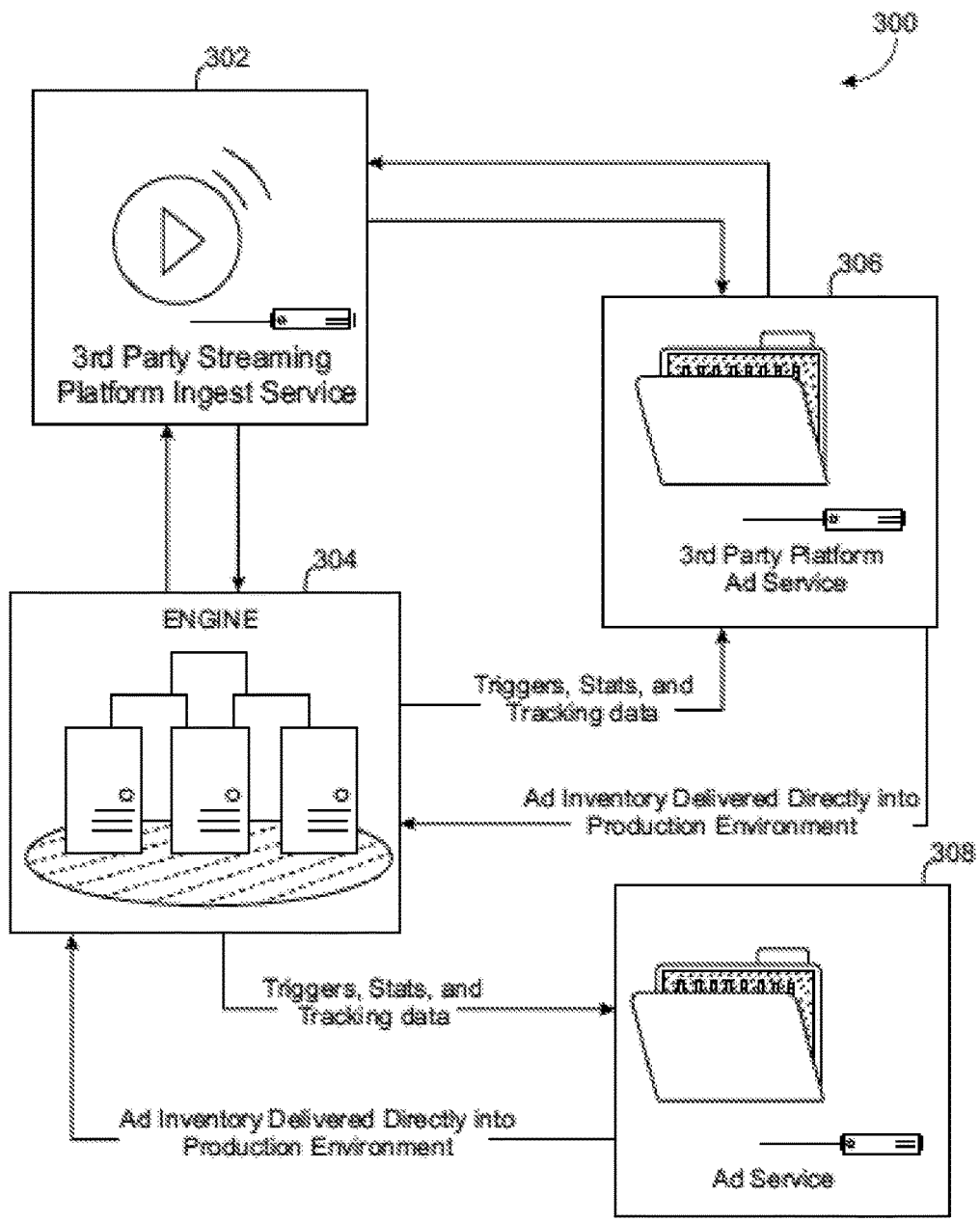
FIG. 4 is a block diagram of an example system for production and delivery of live video and other digital content streams connected to an advertising system, according to embodiments.

FIG. 4 shows an example portion of an embodiment of a video production and delivery system 300 in which a third-party streaming platform ingest service 302 communicates generally with an engine 304, which can be any of many known computerized devices, and which also communicates with a third-party platform ad server 306 and a native ad server 308 as a part of the video production and delivery system 300. The engine 304 can send and receive metadata, including tracking data, statistics on live stream events and triggers for serving and displaying digital advertising units within a live digital content stream. The third-party platform ad server 306 and the native ad server 308 can be configured to send advertising units directly to the engine 304 for adding to a composite stream to be output to the third-party streaming platform ingest service 302. This can allow digital advertising units to be composited directly into an outgoing composite digital content stream from the engine 222, so that digital advertising units cannot be blocked by a third-party web browser plugin being installed on a web browser of a recipient viewer.

In another aspect, the native ad server 308 as part of the video production and delivery system 300 can also send and receive metadata, including tracking data, statistics on live stream events and triggers for serving and displaying advertising units within a live digital content stream and can send digital advertising units directly to the engine 304 for adding to a composite stream to be output to the third-party streaming platform ingest service 302. The system 300 can also be configured to allow specific digital advertising units from the third-party platform ad server 306 or the native ad server 308 to be triggered automatically given signals received from the engine 304 based on a variety of factors such as the current live digital content stream(s) being received by the engine 304, the live digital content stream metadata (such as titles, descriptions, etc.,), based on user interaction received from a video consuming device (e.g., one of 1161-1166 of FIG. 11a), based on chat session information received from a video consuming device (e.g., one of 1161-1166 of FIG. 11a), or based on a predefined frequency.

In a further aspect, the composite digital content stream output of the engine 304, which is sent to the third-party streaming platform ingest service 302 for viewing by a recipient, can also be made clickable by a recipient viewer of the composite digital content stream output through the use of special recognition logic to be built into the viewer's digital content stream player. In such an aspect, special notifications or instructions could be sent from the engine 304 to the recipient viewer's digital content stream player to carry timing and digital advertising unit information such as a region or regions of a digital video content stream to make clickable, hyperlink information to navigate to in a web browser for when a link is clicked, product/service information on the product/service contained in the digital advertising unit, etc.

Figure 5:
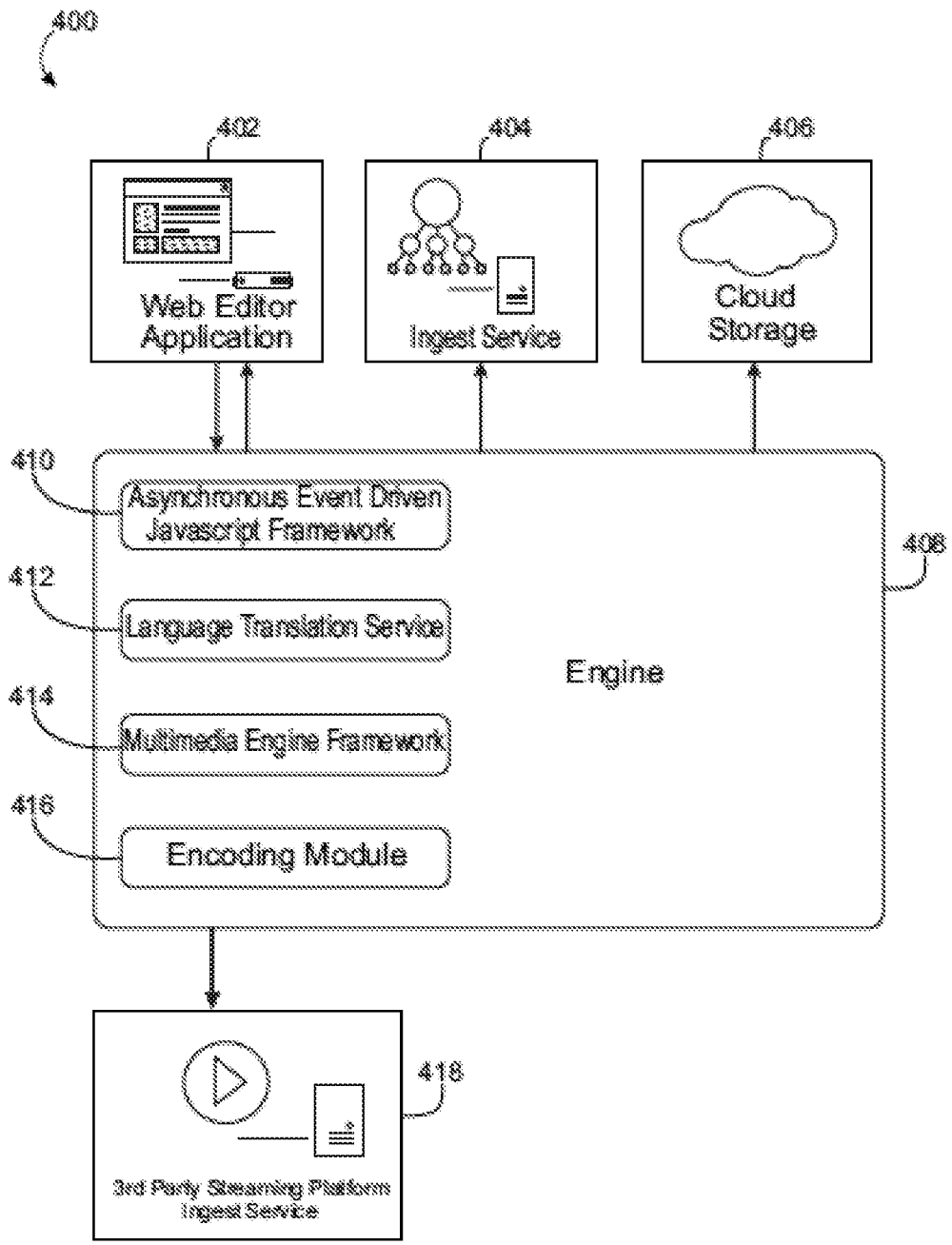
FIG. 5 is a block diagram of an example system and methods for production and delivery of live video and other digital content streams, according to embodiments.

Referring now to FIG. 5, an embodiment of a video production and delivery system 400, similar to systems 100, 200, and 300, is shown, in which a web editor application 402, an ingest service 404 and cloud storage 406 all communicate generally with an engine 408 with data and information. The engine 408 can include processing and memory features and may contain a logical architecture, a stack of technologies, which may be, without limitation, asynchronous event-driven JavaScript, or another known programming language framework 410, a language translation service 412, a multimedia engine framework 414 and an encoding module 416. The engine 408 and its components may be known computerized devices configured with program instructions which may be in the form of software applications to perform the functions outlined above. Together, the components of the engine 408 process incoming data from digital content and digital content streams, and once the processing is complete, a composite digital content stream output is sent by the engine 408 and received by a third-party streaming platform ingest service 418 for display and consumption of a composite live digital content stream by a recipient.

Figure 6:
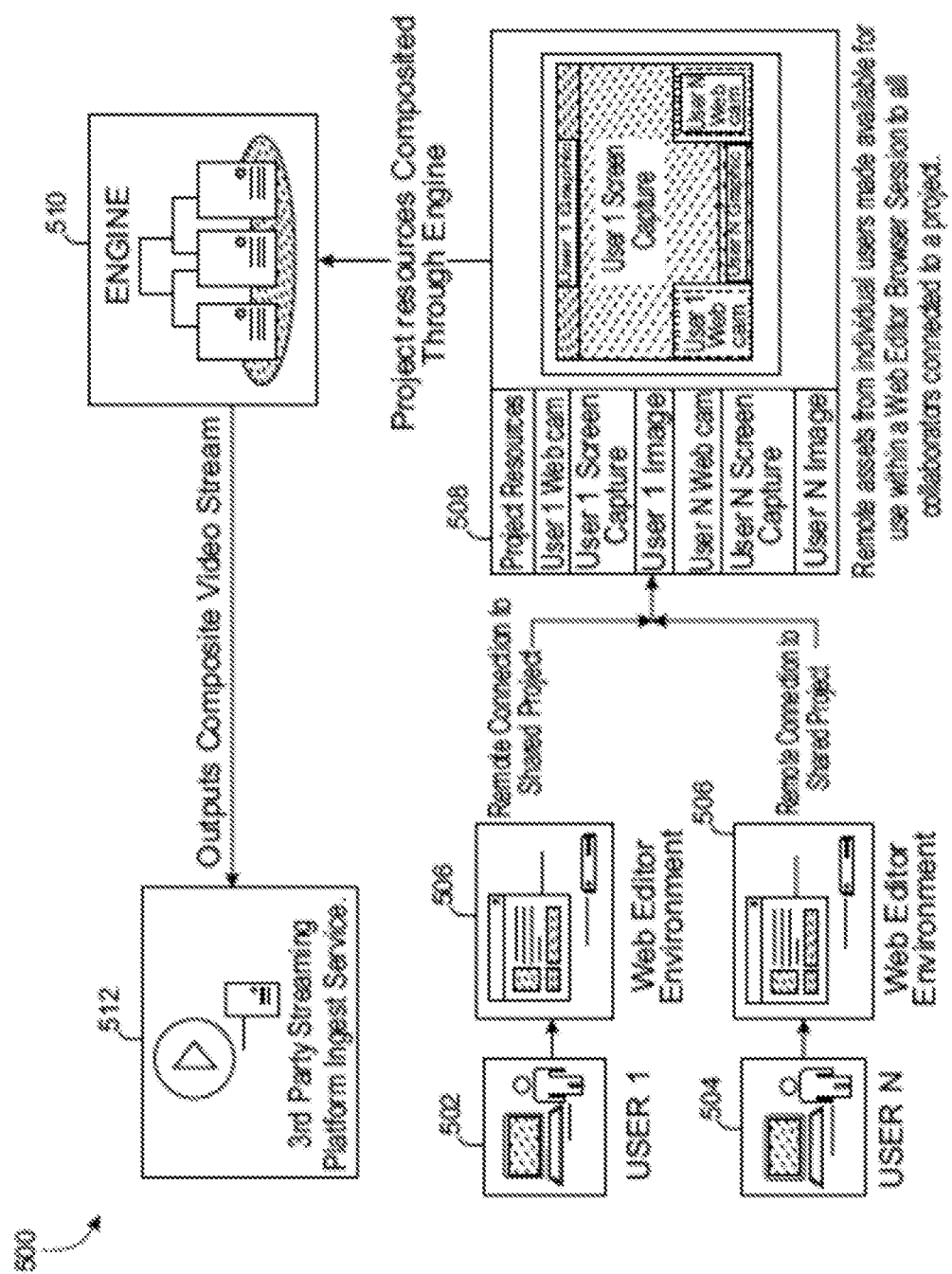
FIG. 6 is a block diagram of an example systems and methods for multi-user production and delivery of live video and other digital content streams, according to embodiments.

In FIG. 6, an embodiment of a video production and delivery system 500 shows the extensibility of the system 500, and can be applied similarly to embodiments in systems 100, 200, 300 and 400. A user 502 communicates generally with an instance of a web editor application 506, while another user 504, representing an infinite number of additional users of the system 500, communicates generally with an instance of the same web editor application 506, which may be scalable to multiple instances of the web editor application 506. Instances of video broadcast projects represented within the web editor application 506 can be shared between users 502 and 504 and the web editor application 506 may allow multiple users 502 and 504 to communicate generally to the same shared instance of a video broadcast project on the web editor application 506 to collaborate simultaneously on the same shared instance of a video broadcast project, including shared viewing, inclusion and manipulation of multiple digital content assets and digital content streams from one or more user 502 or user 504 system input streams or digital content assets stored in cloud storage similar to the cloud storage 210 or 406.

In another aspect, an instance of a user interface 508 of the web editor application 506 may list multiple digital content and media assets of a video broadcast project, including multiple user 502 and user 504 system digital content streams for display and manipulation within a graphical user interface of the web editor application 506, which can be compiled into a composite digital content stream within an engine 510, with similar characteristics to the engine 408 and engines in engine cluster 222. Once a composite digital content stream is created by the single engine 510 within an engine cluster, the composite digital content stream output is sent by the engine 510 and received by a third-party streaming platform ingest service 512 for consumption by a recipient.

Figure 7:
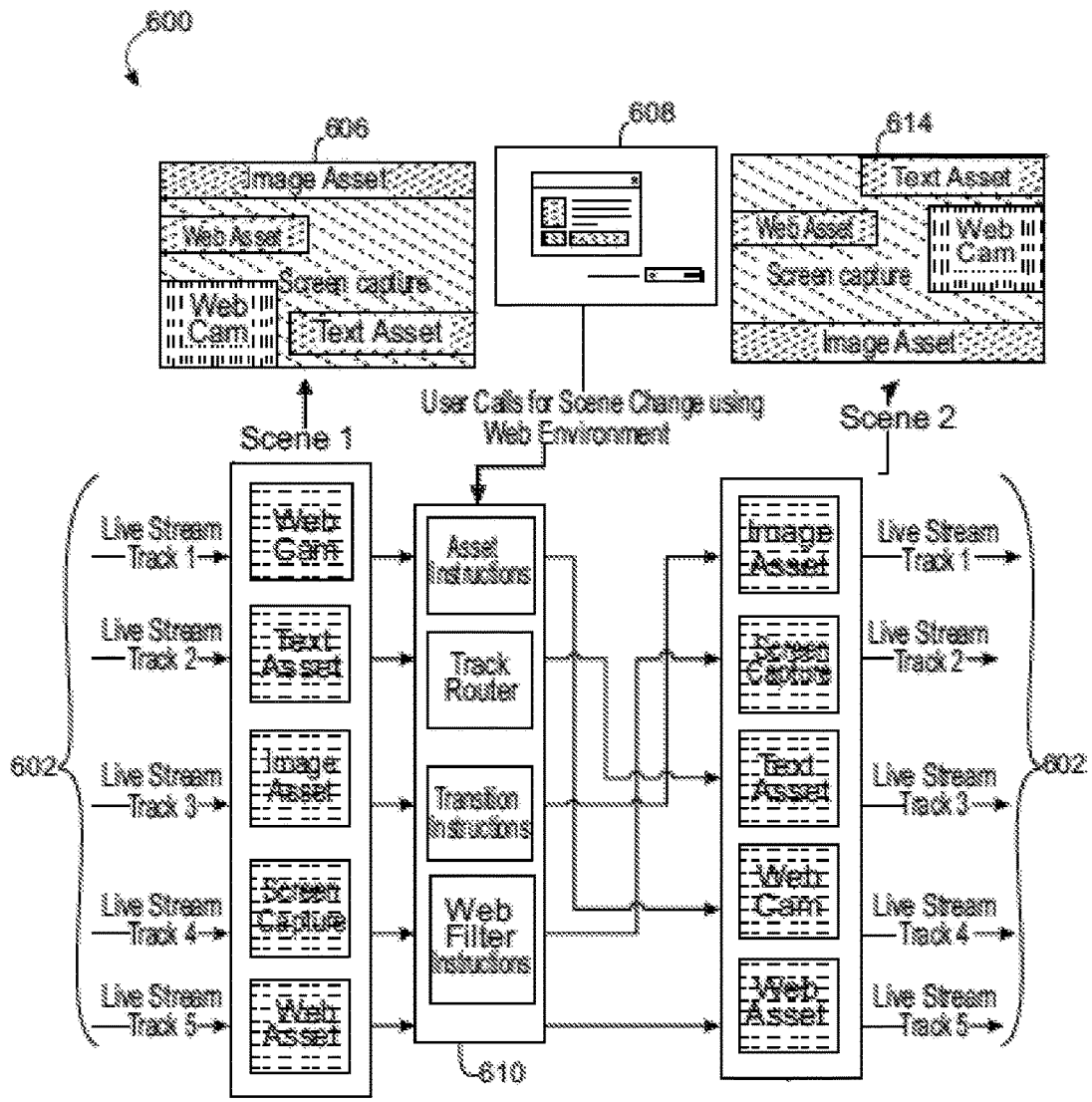
FIG. 7 is a schematic representation of a scene change and digital content stream components in an example system for production and delivery of live video and other digital content streams, according to embodiments.

FIG. 7 is a schematic of an embodiment of layers of live digital content stream data 600 processed by a video processing and delivery system, such as those embodied in systems 100, 200, 300, 400 and 500. In FIG. 7, a video scene change in a set of multiple live digital content streams 602 is performed. Live digital content streams 602 can be streams or static data from multiple and varied input devices, such as a webcam, generated static text assets, images, live display screen captures, web assets, and multiple other digital content inputs as would be known to one skilled in the art. A user 608 of the video production system 600 initiates a call for a scene change from a first scene 606 to a second scene 614 in the live stream composite video display output and a set of instructions and parameters 610 are invoked to cause the scene change. The set of instructions may include digital content asset instructions, track routing, screen positioning, text colors, fonts, sizing of digital content and digital content streams, code injections, transition instructions, web filter instructions and any of a number of parameters which may be contemplated.

Figure 8:
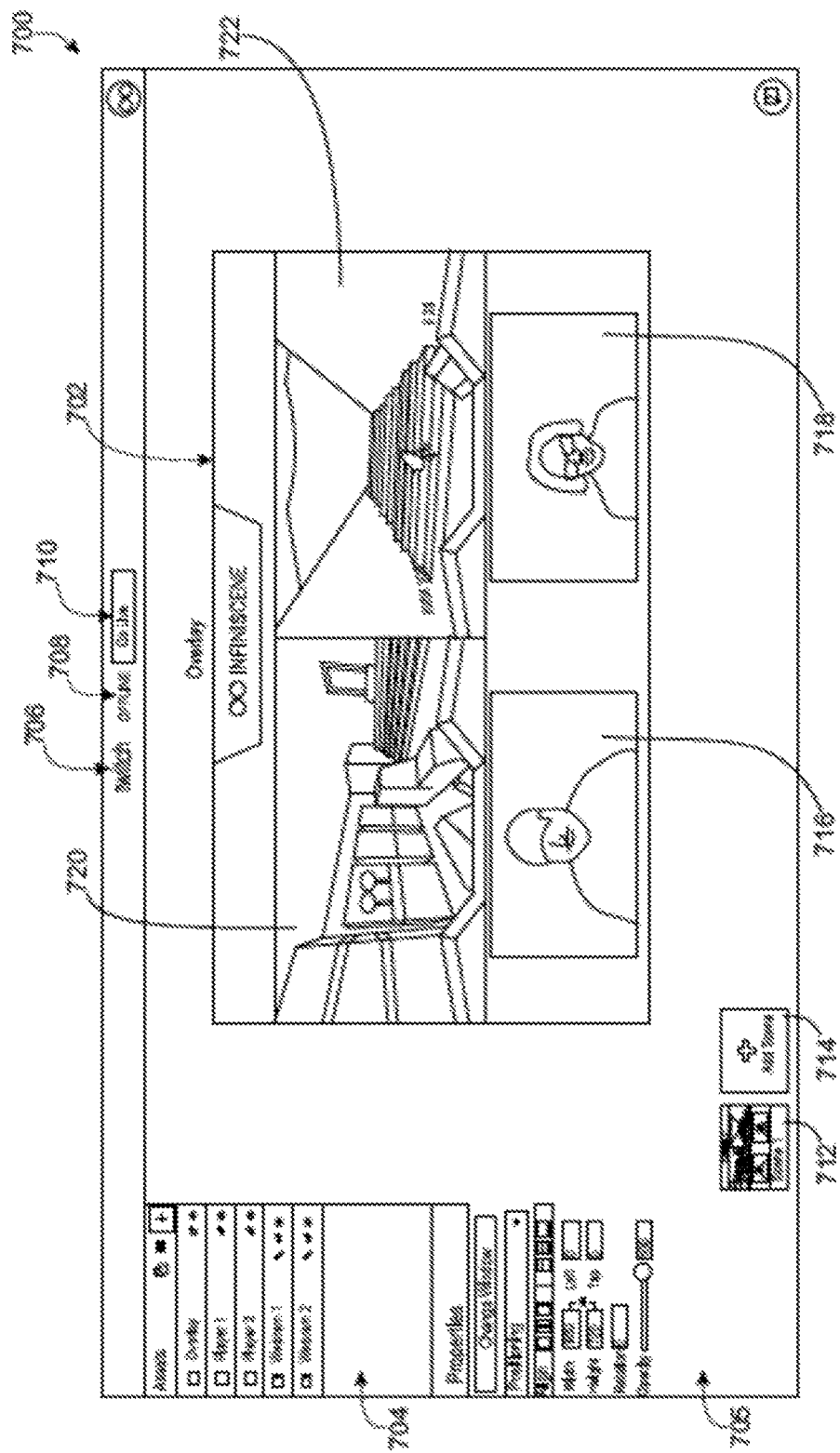
FIG. 8 is a schematic of a virtual user interface where multiple users may view and interact with a system for production and delivery of live video and other digital content streams, according to an example embodiment.

FIG. 8 shows an example of a not currently broadcasting (offline) state of a virtual user interface 700 of a video broadcast project within a video production and delivery system of one embodiment. In a main production screen output area 702, a scene is created and displayed from any number of live digital content streams and digital content assets which may be represented with icons on a toolbar within an asset area 704, and which may be switched on/off. Assets and streams switched off are not displayed in the main production screen output area 702, whereas assets and streams switched on are displayed in the main production screen output area 702. The virtual user interface may be generated at a user's system or by a web editor application within a video production and delivery system similar to that represented by the web editor application 206, and further may be represented in a web editor browser similar to that represented by the web editor browser 204. A properties area 705 may indicate and allow a user of the virtual user interface 700 to change and manipulate certain characteristics and properties of a selected digital content asset or stream available through a toolbar within the virtual user interface 700.

An indicator area on the virtual user interface 700 can include identifier and status information pertaining to a specific video broadcast project and can include an indicator 706 of the third party ingest platform to which a specific video broadcast project's composite digital content stream will be sent; an online/offline indicator 708 showing the status of the broadcast of the composite digital content stream; and an indicator and control 710 to start/stop the broadcast of the composite digital content stream to the third party ingest platform. A thumbnail representation 712 of the current scene being delivered to the main production screen output area 702 can be shown on the virtual user interface 700, together with a control 714 to add additional scenes, which can be created and manipulated from the number of digital content streams and digital content assets represented in asset area 704.

In an embodiment, the main production screen output area 702 shows a scene of a live digital content stream including a first live camera video stream 716, a second live camera video stream 718, a first live program application stream 720, shown as an online gaming display, and a second live program application stream 722, also shown as an online gaming display. Any number of a variety of live online program application streams can be contemplated for the first and second live program application streams 720 and 722, respectively. Additionally, the placement of streams 716, 718, 720, and 722 is infinitely interchangeable and positionable within the main production screen output area 702, as a user can control the placement of these streams within the main production screen output 702. Further, an infinite number of digital content streams and digital content assets can be loaded into the asset area 704 and may also be used in the video broadcast production.

Figure 9:
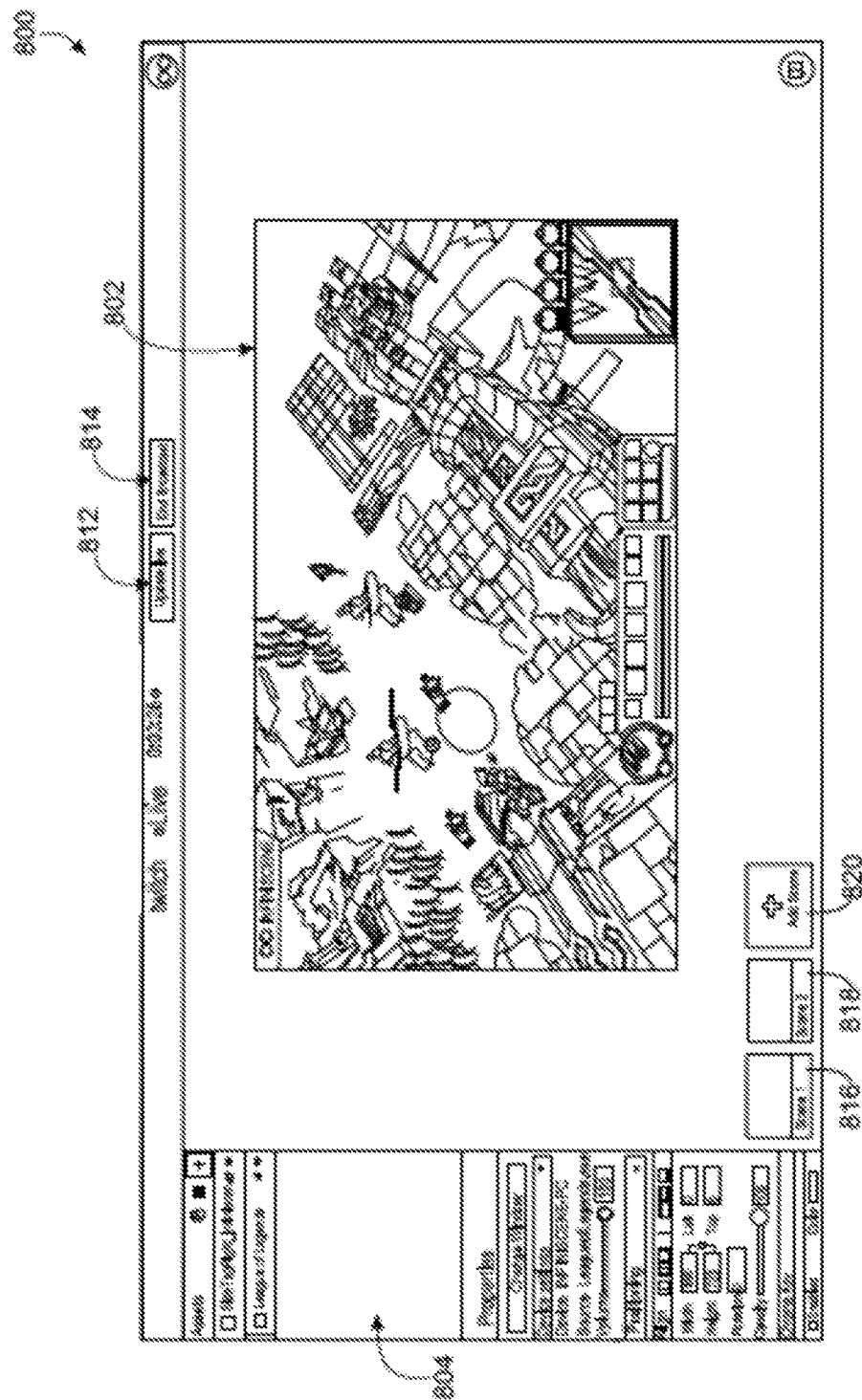
FIG. 9 is a schematic of a virtual user interface with multiple viewable scenes, according to an example embodiment.

FIG. 9 shows an example user interface 800 of a video broadcast and production system of another embodiment of the present invention, in which for a main production screen output 802, a scene is created from any of a number of live stream media assets 804, and in which the main production screen output 802 can be switched through the user interface 800 through the pressing of buttons 816 and 818, and the pressing of control 812, which initiates a scene change, which can be thumbnail representations of scenes displayed in the main production screen output 802, and in which a button 820 is included for adding additional scenes which can be created and manipulated by using the live stream data assets 804. A control 814 on the user interface 800 allows a user to start/end a broadcast stream from being sent and received by a recipient.

Figure 10:
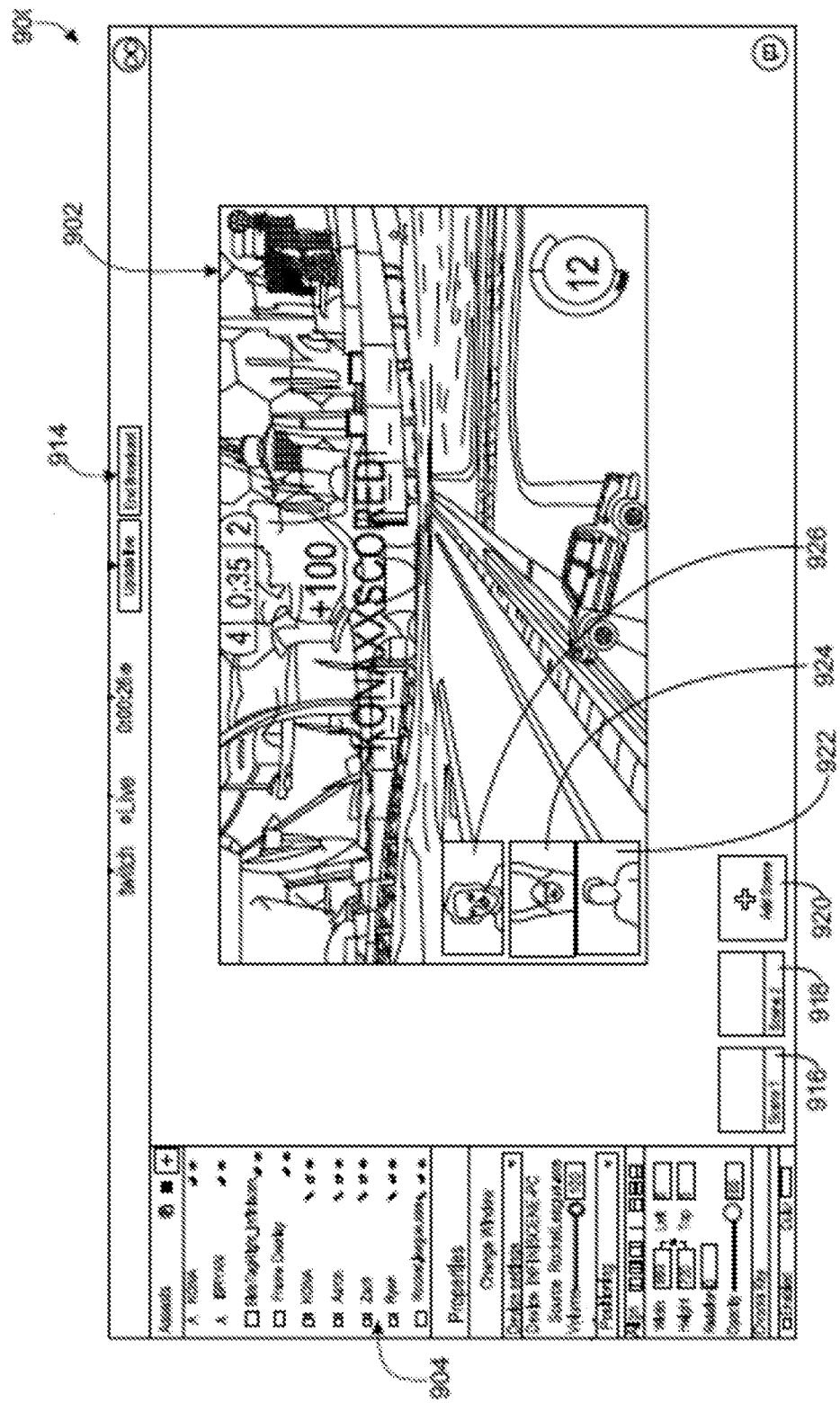
FIG. 10 is a schematic of a virtual user interface with multi-user views within a system for production and delivery of live video and other digital content streams, according to an example embodiment.

In FIG. 10, a user interface of one embodiment of a video broadcast and production system 900 is shown with a main production screen output 902 created from a number of live stream data assets 904. A control 914 on the user interface 900 allows a user to start/end a broadcast stream from being sent to and received by a recipient. The main production screen output 902 can be switched through the user interface 900 through the pressing of buttons 916 and 918, which can be thumbnail representations of scenes displayed in the main production screen output 902, and in which a button 920 is included for adding additional scenes which can be created and manipulated by using the live stream data assets 904. In this embodiment, a number of the live stream data assets 904 are depicted in an overlay setting where a first live video stream 922, a second live video stream 924 and a third live video stream 926 are all overlaid on a live program application stream.

In the above examples, the embodiments 100, 200, 300, 400, 500, 600, 700, 800 and 900 of a video broadcast and production system route data in the form of live streams through the various implementations of the systems. There are many of a number of live streaming protocols including RTMP, RTSP/RTP, HTTP Live Streaming, MMS, etc., as are known or should be known to one skilled in the art, which could be suitable for use in the embodiments of the systems.

Additionally, computing devices of the various implementations of the systems may be implemented in numerous different forms, as shown in the figures. For example, the various systems described herein can be realized in digital electronic circuitry, integrated circuitry, specially designed ASICs (application specific integrated circuits), computer hardware, FPGAs (field-programmable gate arrays), firmware, software, and/or combinations thereof. The various system implementations can include implementation in one or more software applications, executable and/or interpretable, on a programmable system including at least one programmable general or special purpose processor, coupled to receive data and instructions from, and to transmit data and instructions to, one or more storage systems, at least one input device and at least one output device.

It is contemplated that the parts and features of any one of the embodiments described can be interchanged with the parts and features of any other of the embodiments without departing from the scope of the present disclosure. The foregoing description discloses and describes merely exemplary embodiments of the present disclosure and is not intended to be exhaustive or to limit the disclosure to the precise form disclosed. As will be understood by those skilled in the art, the disclosure may be embodied in other specific forms, or modified or varied in light of the above teachings, without departing from the spirit, novelty or essential characteristics of the present invention. Accordingly, the disclosed embodiments are intended to be illustrative, but not limiting, of the scope of the disclosure.

Description of FIGS. 11-16

Systems

Figure 11A:
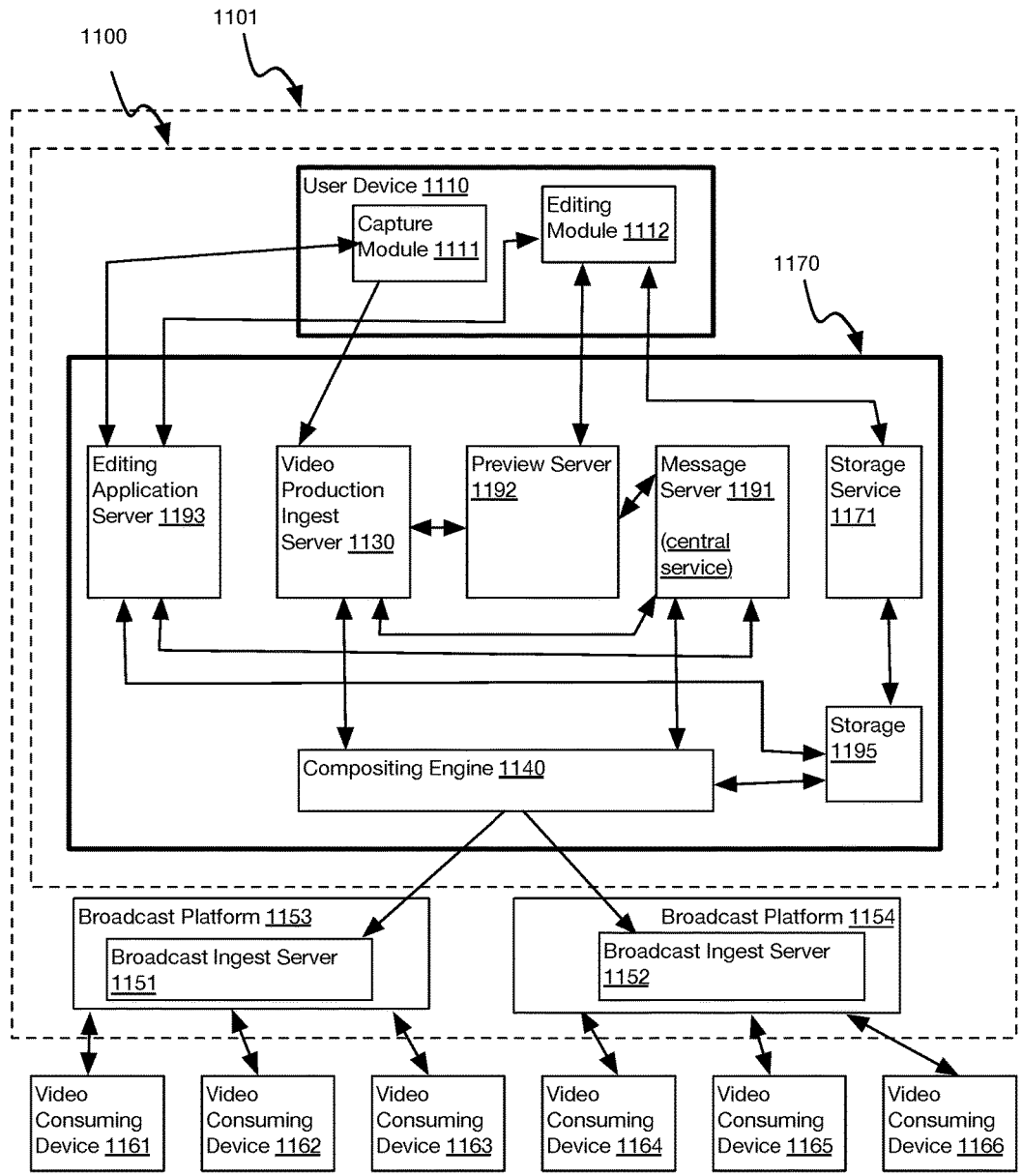
FIGS. 11A-B are block diagrams of systems, according to embodiments.
Figure 11B:
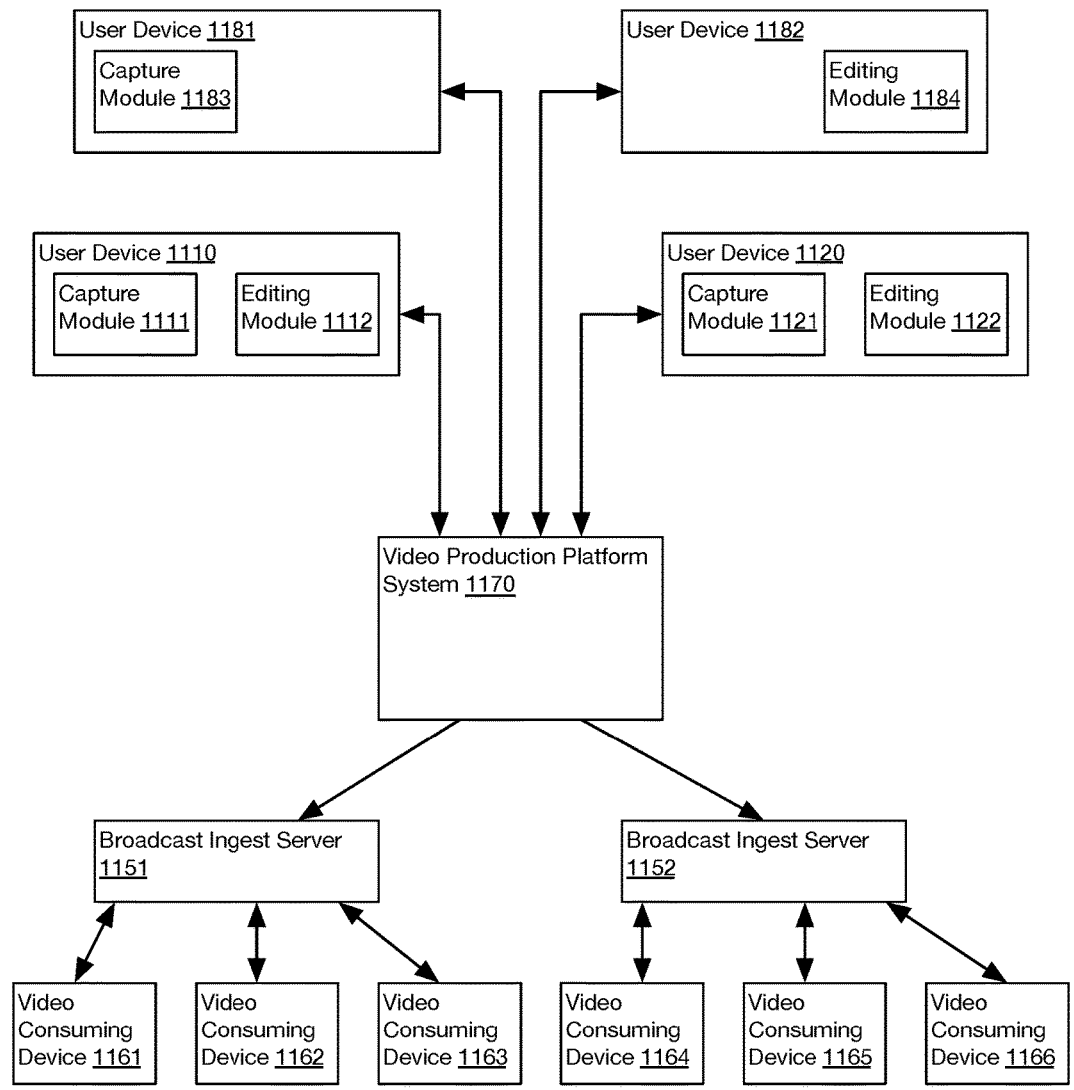

FIGS. 11A and 11B are schematic representations of a video production system 1100, in accordance with embodiments. In some embodiments, the system 1100 is a live video production system. In some embodiments, the system 1100 is constructed to generate live video content. In some embodiments, the system 1100 is constructed to stream video of a video game to video consuming devices (e.g., 1161-1166) via a broadcast ingest server (e.g., 1151, 1152) of a broadcast platform (e.g., 1153, 1154). In some embodiments, the system 1100 is constructed to stream video of multiple video game users to video consuming devices (e.g., 1161-1166) via a broadcast ingest server (e.g., 1151, 1152).

As shown in FIGS. 11A-B, the video production system 1100 includes a video production platform system 1170, and at least one user device (e.g., 1110, 1120, 1181, 1182). In some embodiments, the video production system 1100 is included in a video broadcast system 1101 that includes at least one broadcast ingest server (e.g., 1151, 1152).

In some embodiments, the video production platform system 1170 includes a video production ingest server 1130 and a compositing engine 1140. In some embodiments, at least one user device (e.g., 1110, 1120) includes a capture module (e.g., 1111, 1121). In some embodiments, at least one user device (e.g., 1110, 1120) includes an editing module (e.g., 1112, 1122). As shown in FIG. 11B, user devices 1110 and 1120 each include a capture module and an editing module. As shown in FIG. 11B, user device 1181 includes a capture module 1183, and user device 1182 includes an editing module 1184.

In some embodiments, the video production platform system 1170 is communicatively coupled to at least one user device (e.g., 1110, 1120).

In some embodiments, the video production platform system 1170 is communicatively coupled to at least one capture module (e.g., 1111, 1121).

In some embodiments, the video production platform system 1170 is communicatively coupled to at least one editing module (e.g., 1112, 1122).

In some embodiments, the video production ingest server 1130 is communicatively coupled to at least one capture module (e.g., 1111, 1121).

In some embodiments, the video production ingest server 1130 is communicatively coupled to at least one editing module (e.g., 1112, 1122). In some embodiments, the video production ingest server 1130 is not communicatively coupled to any editing module (e.g., 1112, 1122).

In some embodiments, the video production ingest server 1130 is communicatively coupled to the preview server 1192.

In some embodiments, the compositing engine 1140 is communicatively coupled to at least one editing module (e.g., 1112, 1122).

In some embodiments, the compositing engine 1140 is not communicatively coupled to any editing module (e.g., 1112, 1122).

In some embodiments, the video production platform system 1170 is communicatively coupled to at least one broadcast ingest server (e.g., 1151, 1152) of a broadcast platform (e.g., 1153, 1154).

In some embodiments, the compositing engine 1140 is communicatively coupled to at least one broadcast ingest server (e.g., 1151, 1152).

In some embodiments, at least one broadcast platform (e.g., 1153, 1154) is communicatively coupled to at least one video consuming device (e.g., 1161-1166).

In some embodiments, video consuming devices includes at least one of a phone, mobile computing device, television, computer, wearable computing device, tablet, and any other type of device that is constructed to display streaming video.

In some embodiments, broadcast ingest servers include broadcast ingest servers of third-party streaming platform systems, such as for example, video streaming platform systems provided by Twitch.tv™, YouTube™, Facebook™, and the like.

In some embodiments, the video production platform system 1170 includes a storage (e.g., 1195). In some embodiments, the storage is similar to the cloud storage 108 of FIG. 2. In some embodiments, the storage is similar to the cloud storage 210 of FIG. 3. In some embodiments, the storage is similar to the cloud storage 406 of FIG. 5. In some embodiments, the storage is a cloud storage. In some embodiments, the storage is a data storage. In some embodiments, the storage is a database.

In some embodiments, the video production platform system 1170 includes an editing application server (e.g., 1193) that manages platform accounts for users of the platform system 1170.

In some embodiments, the video production platform system 1170 includes a database. In some embodiments, the storage 1195 includes the database. In some embodiments, the storage 1195 includes a cloud storage. In some embodiments, the database is similar to the database 106 of FIG. 2. In some embodiments, the database is similar to the database 208 of FIG. 3.

In some embodiments, at least one broadcast ingest server is similar to a broadcast ingest server of FIG. 2 (e.g., 112, 114, 116). In some embodiments, at least one broadcast ingest serve is similar to a broadcast ingest server of FIG. 3 (e.g., 224). In some embodiments, at least one broadcast ingest serve is similar to a broadcast ingest server of FIG. 5 (e.g., 418).

In some embodiments, each editing module (e.g., 1112, 1122) is a module of the web editor environment 104 of FIG. 2. In some embodiments, each editing module (e.g., 1112, 1122) is a module of the web editor session 204 of FIG. 3. In some embodiments, each editing module (e.g., 1112, 1122) is a module of the web editor application 206 of FIG. 3. In some embodiments, the video production platform system 1170 includes an editing application server (e.g., 1193) similar to the web editor application 206 of FIG. 3, and each editing module (e.g., 1112, 1122) is communicatively coupled to the editing application server of the video production platform system 1170. In some embodiments, the editing application server 1193 is similar to the web editor application 402 of FIG. 5. In some embodiments, each editing module (e.g., 1112, 1122) is a module of one of the web editor sessions 506 of FIG. 6. In some embodiments, each editing module (e.g., 1112, 1122) is communicatively coupled to a web editor application of the video production platform system, and the web editor application is constructed to provide a user interface similar to the user interface 508 of FIG. 6.

In some embodiments, each capture module (e.g., 1111, 1121) is similar to the desktop application 212 of FIG. 3. In some embodiment, each capture module (e.g., 1111, 1121) is similar to the asset capture user browser 216 of FIG. 3. In some embodiment, at least one user device includes a desktop application similar to the desktop application 212 of FIG. 3, and the capture module (e.g., 1111, 121) is communicatively coupled to the desktop application. In some embodiment, at least one user device includes an asset capture user browser similar to the asset capture user browser 216 of FIG. 3, and the capture module (e.g., 1111, 1121) is communicatively coupled to the asset capture user browser.

In some embodiments, each capture module (e.g., 1111, 1121) includes machine executable instructions that are stored on a storage hardware device of the respective user device and that are executable by a processing unit (e.g., a processor) of the respective user device. In some embodiments, a server device of the platform system 1170 provides each user device (e.g., 1110, 1120) with the instructions of the respective capture module, and the user device stores the received instructions on the storage hardware device.

In some embodiments, each editing module (e.g., 1112, 1122) includes machine executable instructions that are stored on a storage hardware device of the respective user device and that are executable by a processing unit (e.g., a processor) of the respective user device. In some embodiments, a server device of the platform system 1170 provides each user device (e.g., 1110, 1120) with the instructions of the respective editing module, and the user device stores the received instructions on the storage hardware device.

In some embodiments, the video production platform system 1170 is constructed to communicate with at least one capture module (e.g., 1111, 1121) by using a private API (Application Program Interface). In some embodiments, at least one capture module is constructed to communicate with the video production platform system 1170 by using the private API.

In some embodiments, the video production platform system 1170 is constructed to communicate with at least one editing module (e.g., 1112, 1122) by using a private API (Application Program Interface). In some embodiments, at least one editing module is constructed to communicate with the video production platform system 1170 by using the private API.

In some embodiments, at least one user device includes a mobile application similar to the mobile application 217 of FIG. 3. In some embodiments, an external mobile device includes a mobile application similar to the mobile application 217 of FIG. 3, and the mobile device is communicatively coupled to at least one of the video production ingest server 1130, a broadcast ingest server (e.g., 1151, 1152), an editing application server (e.g., 1193), and a user device (e.g., 1110, 1120).

In some embodiments, the video production platform system 1170 includes a preview server 1192. In some embodiments, the video production platform system 1170 includes a message server 1191.

In some embodiments, the preview server 1192 is similar to the preview service 214 of FIG. 3. In some embodiments, the message server 1191 is similar to the central service 220 of FIG. 3.

In some embodiments, the system 1170 includes a storage service 1171. In some embodiments, the storage service 1171 is communicatively coupled to the storage 1195. In some embodiments, the storage service 1171 is communicatively coupled to a cloud storage external to the platform system 1170. In some embodiments, the storage service 1171 is constructed to receive a storage request (e.g., a request to store data, a request to retrieve data) from an editing module, and process the storage request by storing data or retrieving data from the storage 1195 based on the received request. In some embodiments, the storage service 1171 is constructed to receive a storage request (e.g., a request to store data, a request to retrieve data) from an editing module, and process the storage request by storing data or retrieving data from an external cloud storage based on the received request.

In some embodiments, the compositing engine 1140 is similar to the engine cluster 222 of FIG. 3. In some embodiments, the compositing engine 1140 is similar to the engine 304 of FIG. 4. In some embodiments, the compositing engine 1140 is similar to the engine 408 of FIG. 5.

In some embodiments, at least one user device (e.g., 1110, 1120) is similar to a user device of FIG. 2 (e.g., 102). In some embodiments, at least one user device (e.g., 1110, 1120) is similar to a user device of FIG. 3 (e.g., 202).

In some embodiments, the video production ingest server 1130 is similar to at least one of the processing system 110 of FIGS. 1 and 2, the ingest service 218 of FIG. 3, and the ingest service 404 of FIG. 5.

In some embodiments, at least one broadcast ingest server (e.g., 1151, 1152) is similar to at least one of the ingest service 112 of FIG. 1, the ingest services 112, 114, 116 of FIG. 2, the ingest service 224 of FIG. 3, the ingest service 302 of FIG. 4, the ingest service 418 of FIG. 5, and the ingest service 512 of FIG. 6.

In some embodiments, the compositing engine 1130 is similar to at least one of the processing system 110 of FIG. 1, the processing system 110 of FIG. 2, the engine cluster 222 of FIG. 3, the engine 304 of FIG. 4, the engine 408 of FIG. 5, and the engine 510 of FIG. 6.

In some embodiments, the video production platform system 1170 includes an ad service system. In some embodiments, the compositing engine 1140 is communicatively coupled to the ad service system. In some embodiments, the ad service system is similar to the ad service system 308 of FIG. 4.

In some embodiments, the video production platform system 1170 is communicatively coupled to an external ad service system. In some embodiments, the compositing engine 1140 is communicatively coupled to the external ad service system. In some embodiments, at least one broadcast ingest server (e.g., 1152, 1152) is communicatively coupled to the external ad service system. In some embodiments, the external ad service system is similar to the ad service system 306 of FIG. 4.

In some embodiments, at least one user device (e.g., 1110, 1120) includes at least one video device that is constructed to generate video data. In some embodiments, at least one capture module (e.g., 1111, 1121) is communicatively coupled to at least one video device that is constructed to generate video data. In some embodiments, at least one video device is a graphics card. In some embodiments, at least one video device is a video camera. In some embodiments, at least one video device is a capture card. In some embodiments, at least one video device is an image capture device. In some embodiments, at least one video device is a graphics card that is constructed to generate display video for display by a display device of a user device. In some embodiments, video data generated by at least one video device corresponds to a video game. In some embodiments, video data generated by at least one video device is screen capture data. In some embodiments, video data generated by at least one video device is web cam data.

In some embodiments, the message server 1191 is similar to the central service described herein (e.g., the central service 220). In some embodiments, the message server 1191 is a queue service. In some embodiments, the message server 1191 is an Amazon™ Simple Queue Service. In some embodiments, the message server 1191 is constructed to receive a live broadcast instruction provided by a video editing module (e.g., 1112) via the editing application server 1193, and provide the live broadcast instruction to the compositing engine 1140. In some embodiments, the message server 1191 is constructed to receive a scene information provided by a video editing module (e.g., 1112) via the editing application server 1193, and provide the scene information to the compositing engine 1140.

In some embodiments, the preview server 1192 is constructed to provide notifications to at least one editing module (e.g., 1112) indicating available video streams for display by the editing module. In some embodiments, the platform ingest server 1130 is constructed to provide a notification of an available video stream to the preview server 1192, and in response, the preview server 1192 provides the notification to an editing module. In some embodiments, the preview server 1192 is constructed to provide notifications to the compositing engine 1140 via the message server 1191.

In some embodiments, the preview server 1192 is similar to the preview service 214 of FIG. 3.

In some embodiments, the compositing engine 1140 is constructed to provide a composite live video stream to directly to a broadcast ingest server (e.g., 1151).

In some embodiments, the application server 1193 is constructed to provide machine-executable instructions for video production to an editing module of a user device (e.g., the editing module 1112 of the user device 1110).

In some embodiments, the application server 1193 is constructed to receive a live broadcast instruction provided by a video editing module (e.g., 1112), and provide the live broadcast instruction to the message server 1191; the message server 1191 is constructed to provide the live broadcast instruction to the compositing engine 1140. In some embodiments, the application server 1193 is constructed to receive scene information provided by a video editing module (e.g., 1112), and provide the scene information to the message server 1191; the message server 1191 is constructed provide the scene information to the compositing engine 1140.

In some embodiments, the platform ingest server 1130 is constructed to provide a video stream received from capture module of a first user device (e.g., the capture module 1111 of user device 1110) to an editing module of a second user device (e.g., the editing module 1121 of the user device 1120). In some embodiments, the platform ingest server 1130 is constructed to provide a video stream received from capture module of a first user device (e.g., the capture module 1111 of user device 1110) to an editing module of the first user device.

In some embodiments, the message server 1191 is constructed to provide scene information received from an editing module of a first user device (e.g., the editing module 1112 of user device 1110) to an editing module of a second user device (e.g., the editing module 1121 of the user device 1120 of FIG. 11B) via the editing application server 1193. More specifically, in some embodiments, the message server 1191 is constructed to provide scene information received from an editing module of a first user device (e.g., the editing module 1112 of user device 1110) to the editing application server 1193, and the editing application server 1193 is constructed to provide the scene information to an editing module of a second user device (e.g., the editing module 1121 of the user device 1120 of FIG. 11B).

In some embodiments, the message server 1191 is constructed to provide scene information received (indirectly) from an editing module of a first user device (e.g., the editing module 1112 of user device 1110) and an editing module of a second user device (e.g., the editing module 1121 of the user device 1120) to the compositing engine 1140.

In some embodiments, the message server 1191 is constructed to provide scene information received (directly) from an editing module of a first user device (e.g., the editing module 1112 of user device 1110) and an editing module of a second user device (e.g., the editing module 1121 of the user device 1120) to the compositing engine 1140.

In some embodiments, the application server 1193 is constructed to provide machine-executable instructions for video production to an editing module of a user device (e.g., the editing module 1112 of the user device 1110). In some embodiments, the application server 1193 is constructed to receive a live broadcast instruction provided by a video editing module (e.g., 1112), and provide the live broadcast instruction to the compositing engine 1140 via the message server 1191. In some embodiments, the application server 1193 is constructed to receive scene information provided by a video editing module (e.g., 1112) and provide the scene information to the compositing engine 1140 via the message server 1191.

In some embodiments, the devices 1110 (shown in FIGS. 11A and B) and 1120 (shown in FIG. 11B) are authenticated by the platform system 1170 for access to a shared first video production project. In some embodiments, the editing module 1112, the capture module 1111, the editing module 1122, and the capture module 1121 are each constructed to communicate with the platform system 1170 by providing authentication information to the platform system 1170. In some embodiments, the editing module 1112 and the editing module 1122 are each constructed to communicate with the platform system 1170 by providing authentication information to the platform system 1170. In some embodiments, each user device 1110 and 1120 accesses the shared first video production project by providing authentication credentials (e.g., username and password) of a user account (e.g., the account of the account record 1501 of FIG. 15), and responsive to a determination by the platform system 1170 that the user authentication credentials provide access to the first video production project, the platform system 1170 provides session information (e.g., a session token, etc.), and the user device includes the session information in at least one communication between the user device and the platform system 1170.

In some embodiments, the platform system 1170 authenticates the devices 1110 (shown in FIGS. 11A and B) and 1120 (shown in FIG. 11B) for access to a shared first video production project. In some embodiments, the platform system 1170 authenticates the devices 1110 (shown in FIGS. 11A and B) and 1120 (shown in FIG. 11B) for access to a shared first video production project by using a third-party platform system that performs the authentication. In some embodiments, the platform system 1170 authenticates the devices 1110 (shown in FIGS. 11A and B) and 1120 (shown in FIG. 11B) for access to a shared first video production project by using a third-party platform system that performs the authentication, and the third-party platform system provides the platform system 1170 with information (e.g., metadata) authorizing the platform system 1170 to use a broadcast account for the broadcast platform (e.g., 1153, 1154) that is associated with the first platform account.

In some embodiments, the platform system 1170 is a multi-tenant platform system, and the authentication credentials provided by a user device are authentication credentials of a platform account (e.g., the platform account of the account record 1501 of FIG. 15) managed by the editing application server 1193. In some embodiments, the first user device 1110 is associated with a first platform account and first platform authentication credentials, and the second user device 1110 is associated with a second platform account and second platform authentication credentials. In some embodiments, the first video production project is associated with a platform account of the first user device 1110. In some embodiments, a second video production project is associated with a third user device (not shown), and the first user device 1110 and the second user device 1120 are not authorized to access the second video production project.

In some embodiments, the capture module 1121 is similar to the capture module 1111. In some embodiments, the editing module 1122 is similar to the editing module 1112.

In some embodiments, the video production ingest server 1130 is communicatively coupled to the capture modules 1111 (FIGS. 11A-B) and 1121 (FIG. 11B) of the authenticated user devices 1110 and 1120, the compositing engine 1140, the message server 1191, and the preview server 1192.

In some embodiments, the video production ingest server 1130 is communicatively coupled to the editing modules 1112 and 1122.

As shown in FIG. 11A, the compositing engine 1140 is communicatively coupled to the message server 1191, the ingest server 1130, and the storage 1195. In some embodiments, the compositing engine 1140 is communicatively coupled to the external broadcast ingest servers 1151 and 1152.

As shown in FIG. 11A, the message server 1191 is communicatively coupled to the preview server 1192, the editing application server 1193, the ingest server 1130, and the compositing engine 1140.

As shown in FIG. 11A, the preview server 1192 is communicatively coupled to each editing module (e.g., 1112 and 1122) of a user device that is authenticated for the first video production project, the message server 1191, and the ingest server 1130.

As shown in FIG. 11A, the editing application server 1193 is communicatively coupled to each editing module (e.g., 1112 and 1122) of a user device that is authenticated for the first video production project.

As shown in FIG. 11A, the capture module 1111 is communicatively coupled to the editing application server 1193. In some embodiments, the capture module 1121 is communicatively coupled to the application server 1193. In some embodiments, the capture module 1121 is communicatively coupled to the ingest server 1130.

As shown in FIG. 11A, in some embodiments, the storage 1195 is communicatively coupled to the storage service 1171, the compositing engine 1140, and the application server 1193. In some embodiments, the storage 1195 stores a project record for the first video production project (e.g., the project record 1301 of FIG. 13). In some embodiments, the storage 1195 stores a scene record for each scene of the first video production project (e.g., the scene record 1401 and the scene record 1402 of FIG. 14).

Editing Module Instructions

In some embodiments, the editing module 1112 is constructed to provide a start capture instruction to the capture module 1111 via the editing application server 1193. In some embodiments, the editing module 1112 is constructed to provide a stop capture instruction to the capture module 1111 via the editing application server 1193. In some embodiments, the editing module 1112 is constructed to provide a start capture instruction to the capture module 1121 (e.g., of another user device that is authenticated for the first video production project) via the editing application server 1193. In some embodiments, the editing module 1112 is constructed to provide a stop capture instruction to the capture module 1121 (e.g., of another user device that is authenticated for the first video production project) via the editing application server 1193.

In some embodiments, the capture module 1111 is constructed to receive a stop capture user-instruction via a user interface of the device 1110. In some embodiments, the capture module 1121 is constructed to receive a stop capture user-instruction via a user interface of the device 1120.

In some embodiments, the editing module 1112 is constructed to provide the start capture instruction responsive to user input received by user device 1110. In some embodiments, the editing module 1112 is constructed to provide the stop capture instruction responsive to user input received by user device 1110. In some embodiments, the editing module 1122 is constructed to provide start capture instructions and stop capture instructions as described herein for the editing module 1112.

In some embodiments, the editing module 1112 is constructed to provide a start live broadcast instruction to the compositing engine 1140 via the editing application server 1193 and the message server 1191. In some embodiments, the editing module 1112 is constructed to provide an end broadcast instruction to the compositing engine 1140 via the editing application server 1193 and the message server 1191. In some embodiments, the editing module 1112 is constructed to provide a live update instruction to the compositing engine 1140 via the editing application server 1193 and the message server 1191.

In some embodiments, the editing module 1112 is constructed to provide a start live broadcast instruction to the application server 1193, the application server 1193 is constructed to provide the start live broadcast instruction to the message server 1191, and the message server 1191 is constructed to provide the start live broadcast instruction to the compositing engine 1140. In some embodiments, the editing module 1112 is constructed to provide an end broadcast instruction to the application server 1193, the application server 1193 is constructed to provide the start live broadcast instruction to the message server 1191, and the message server 1191 is constructed to provide the start live broadcast instruction to the compositing engine 1140. In some embodiments, the editing module 1112 is constructed to provide a live update instruction to the application server 1193, the application server 1193 is constructed to provide the start live broadcast instruction to the message server 1191, and the message server 1191 is constructed to provide the start live broadcast instruction to the compositing engine 1140.

In some embodiments, the editing module 1112 is constructed to provide a scene transition instruction to the compositing engine 1140 via the editing application server 1193 and the message server 1191.

In some embodiments, the editing module 1122 is constructed to provide live broadcast instructions, end broadcast instructions, live update instructions, and scene transition instructions to the compositing engine 1140 via the editing application server 1193 and the message server 1191, as described herein for the editing module 1112.

Scene Information

In some embodiments, the editing module 1112 is constructed to provide scene information to the compositing engine 1140 via the editing application server 1193 and the message server 1191. In some embodiments, the editing module 1122 is constructed to provide scene information to the compositing engine 1140 as described herein for the editing module 1112.

In some embodiments, scene information of a scene includes at least information identifying at least one video stream (e.g., a video stream from a capture module of a user device authenticated for the first video production project). In some embodiments, scene information of a scene includes at least information identifying at least one video stream (e.g., a video stream from a capture module of a user device authenticated for the first video production project), and information identifying a first asset. In some embodiments, the first asset information specifies data of the first asset and positional information (positioning information) of the first asset for the scene of the scene information. In some embodiments, scene information of a scene includes positional information of each video stream identified by the scene information. In some embodiments, each asset of the scene information is one of a text asset, a web asset and an image asset. In some embodiments, data of at least one asset of scene information is stored at the storage 1195.

Figure 14:
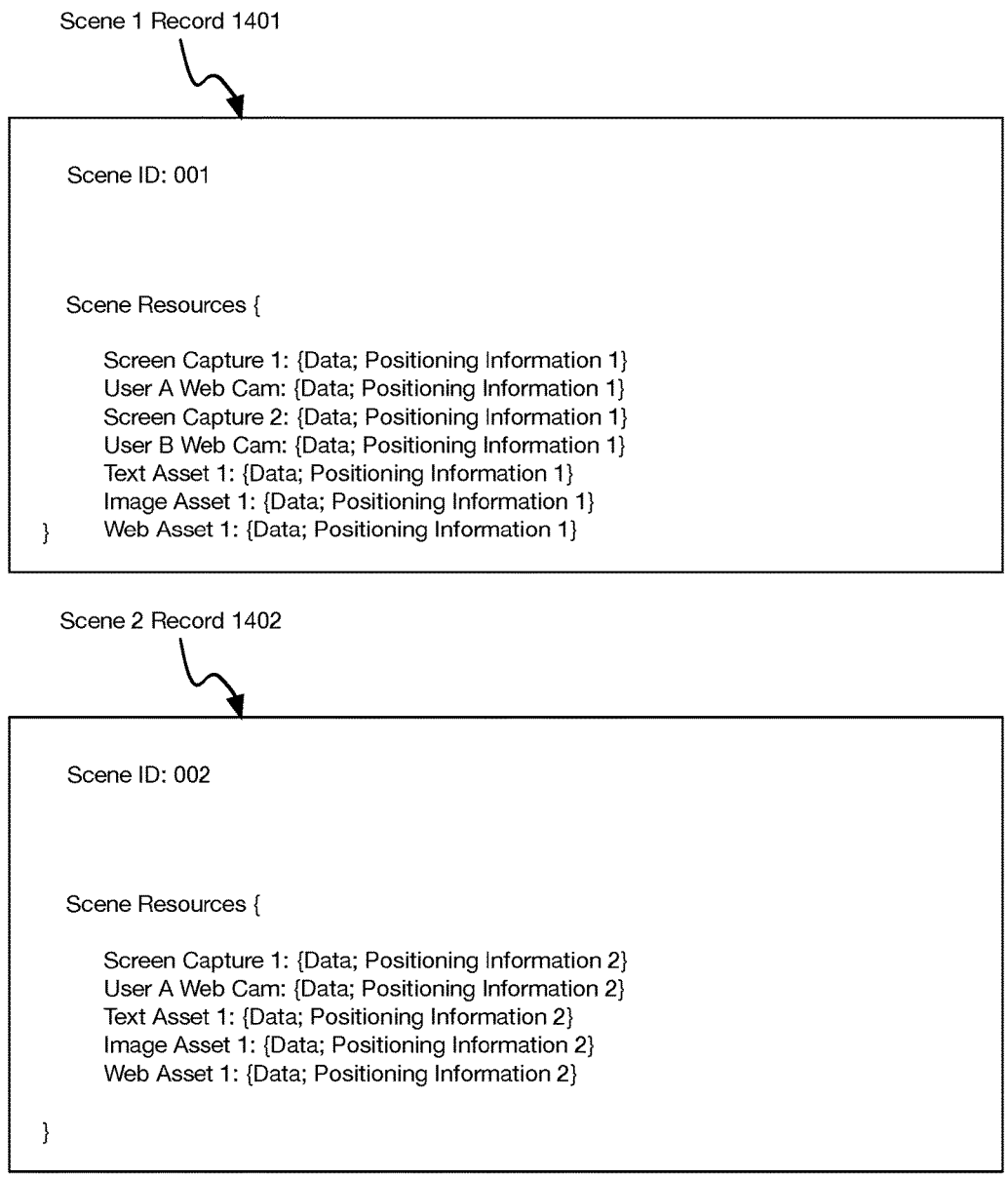
FIG. 14 is a diagram depicting exemplary scene records, according to embodiments.
Figure 15:
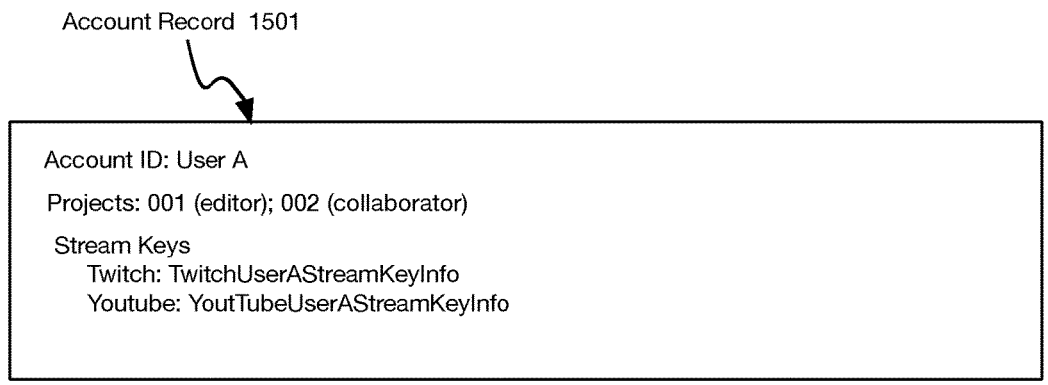
FIG. 15 is a diagram depicting an exemplary account records, according to embodiments.

In some embodiments, scene information includes information depicted in scene records 1401 and 1402 of FIG. 14.

In some embodiments, scene information includes at least one of first asset instructions, track routing instructions, screen positioning instructions, text color instructions, font instructions, sizing instructions, code injection instructions, transition instructions, and web filter instructions.

Capture Module

In some embodiments, responsive to a start capture instruction received from an editing module (of a user device that is authenticated for the first video production project) via the editing application server 1193, the capture module 1111 is constructed to capture video data generated by a video device of the user device 1110, generate a first video stream, and provide the video stream to the platform ingest server 1130. In some embodiments, the start capture instruction specifies the video device of the user device 1110. In some embodiments, the start capture instruction is provided by an editing module of a second user device (authenticated for the first video production project) via the application server 1193.

In some embodiments, responsive to a stop capture instruction received from an editing module (of a user device that is authenticated for the first video production project) via the editing application server 1193, the capture module 1111 is constructed to stop capturing the video data generated by the video device of the user device 1110. In some embodiments, the stop capture instruction specifies the video device of the user device 1110. In some embodiments, the stop capture instruction received by the capture module 1111 is provided by an editing module of a different user device (authenticated for the first video production project) via the application server 1193.

In some embodiments, responsive to a start capture instruction received from an editing module (of a user device that is authenticated for the first video production project) via the application server 1193, the capture module 1121 is constructed to capture video data generated by a video device of the user device 1120, generate a first video stream, and provide the video stream to the platform ingest server 1130. In some embodiments, the start capture instruction specifies the video device of the user device 1120. In some embodiments, the start capture instruction received by the capture module 1121 is provided by an editing module of a different user device (authenticated for the first video production project) via the application server 1193.

In some embodiments, responsive to a stop capture instruction received from an editing module (of a user device that is authenticated for the first video production project) via the application server 1193, the capture module 1121 is constructed to stop capturing the video data generated by the video device of the user device 1120. In some embodiments, the stop capture instruction specifies the video device of the user device 1120. In some embodiments, the stop capture instruction received by the capture module 1121 is provided by an editing module of a different user device (authenticated for the first video production project) via the application server 1193.

In some embodiments, the capture module 1111 is constructed to determine a codec for each video stream generated by the capture module 1111. In some embodiments, the capture module 1111 is constructed to determine a codec for at least one video stream generated by the capture module 1111. In some embodiments, the determined codec is a hardware codec of the user device that includes the capture module (e.g., 1110). In some embodiments, the determined codec is a software codec, and the capture module 1111 is constructed to install the software codec at the user device that includes the capture module 1111.

In some embodiments, the capture module 1111 is constructed to determine an encoder for each video stream generated by the capture module 1111. In some embodiments, the capture module 1111 is constructed to determine an encoder for at least one video stream generated by the capture module 1111. In some embodiments, the determined encoder is a hardware encoder of the user device that includes the capture module (e.g., 1110). In some embodiments, the determined encoder is a software encoder, and the capture module 1111 is constructed to install the software encoder at the user device that includes the capture module 1111.

In some embodiments, the capture module 1111 is constructed to determine a bitrate for each video stream generated by the capture module 1111. In some embodiments, the capture module 1111 is constructed to determine a bit rate for at least one video stream generated by the capture module 1111.

In some embodiments, the editing module 1112 is constructed to receive user input received by the first user device that specifies a resolution, framerate (frames per second (FPS)), and quality, and responsive to receiving the user input, the editing module 1112 provides the specified resolution, framerate and quality to the capture module 1111. Responsive to the specified resolution, framerate and quality, the capture module 1111 determines a bitrate to use for a video stream generated with the specified resolution and framerate, and the capture module 1111 generates a video stream with the determined bitrate and the specified framerate and resolution. In some embodiments, prior to providing the generated video stream to the platform ingest server 1130, the capture module 1111 performs a speed test for the communication link between the capture module 1111 and the platform ingest server 1130, and if the speed test indicates that there is not enough bandwidth to send the video stream at the determined bitrate and the specified framerate and resolution, then the capture module 1111 determines a lower bitrate and generates the video stream with the determined lower bitrate and the specified framerate and resolution.

Ingest Server

In some embodiments, the platform ingest server 1130 is constructed to receive a video stream from the capture modules 1111 and 1121 (e.g., of user devices that are authenticated for the first video production project), and associate the video stream with the first video production project. In some embodiments, the capture modules 1111 and 1121 provide project information identifying the first video production project (e.g., the session information, a project ID, and the like) during providing of the video stream to the ingest server 1130, and the ingest server 1130 uses the project information to associate the received video stream with the first video production project. In some embodiments, the ingest server 1130 is constructed to provide an "available video stream" notification to the preview server 1192 responsive to reception of a video stream from a capture module (e.g., 1111, 1121), the notification indicating that the video stream can be accessed from the ingest server 1130 for the first video production project. In some embodiments, the preview server 1192 provides the "available video stream" notification to each editing module of a user device that is authenticated for the first video production project.

In some embodiments, the ingest server 1130 is constructed to provide a "ending stream" notification to the preview server 1192 responsive to ending of a video stream from a capture module (e.g., 1111, 1121), the notification indicating that the video stream can no longer be accessed from the ingest server 1130. In some embodiments, the preview server 1192 provides the "ending video stream" notification to each editing module of a user device that is authenticated for the first video production project.

In some embodiments, the ingest server 1130 is constructed to receive a video stream from capture modules, regardless of whether the compositing engine 1140 is using the video stream. In other words, reception of a video stream by the ingest server 1130 is independent from use of the video stream by the compositing engine 1140. In this manner, live video streams can be received by the video production ingest server 1130 prior to a live video broadcast, such that the video streams are readily available for use by the compositing engine 1140 responsive to initiation of a live video broadcast. In some embodiments, the ingest server 1130 continues to receive a video stream even if the compositing engine 1140 receives instructions for a scene change that does not include the video stream. In other words, in some embodiments, the ingest server 1130 continues to receive a video stream after removal of the video stream from a live broadcast stream.

In some embodiments, the ingest server 1130 is constructed to provide a video stream of the first video production project to an editing module (of a user device authenticated for the first video production project), responsive to a request provided by the editing module. In some embodiments, the ingest server 1130 is constructed to provide a video stream of the first video production project to an editing module (of a user device authenticated for the first video production project), responsive to a request provided by the editing module via the editing application server 1193 and the message server 1191. In some embodiments, the request provided by the editing module includes information identifying the requested video stream, and the session information for the first video production project.

Compositing Engine

In some embodiments, the compositing engine 1140 is constructed to generate a composite video stream that includes a video stream for a video project (provided by a capture module, e.g., 1111, 1121, authenticated for the video project) and data of a first asset (e.g., an asset stored at the storage 1195, an external storage, and the like), in accordance with scene information provided by at least one editing module (e.g., 1112, 1122) (via the editing application server 1193 and the message server 1191) authenticated for the video project. The compositing engine 1140 is constructed to generate the composite video stream responsive to a broadcast instruction. In some embodiments, the broadcast instruction is provided by an editing module (authenticated for the video project) via the editing application server 1193 and the message server 1191. In some embodiments, responsive to the broadcast instruction, the compositing engine 1140 provides a video stream request to the ingest server 1130 to request the video stream. Responsive to the video stream request, the ingest server 1130 provides the requested video stream to the compositing engine 1140 and the compositing engine 1140 generates the composite video stream by using the requested video stream and the received scene information. The compositing engine provides the composite video stream to a broadcast ingest server (e.g., 1152) configured for the video project by using user stream key information for each configured broadcast ingest server. In some embodiments, the platform system 1170 specifies broadcast ingest servers for a project in a project record (e.g., the project record 1301 of FIG. 13). In some embodiments, user stream key information is included in a user account record (e.g., the account record 1501 of FIG. 15).

Editing Application Server

In some embodiments, the editing application server 1193 is constructed to synchronize scene information among multiple editing modules (e.g., 1112, 1122) collaborating on a video project. In some embodiments, the editing application server 1193 is constructed to provide scene information generated by a first editing module (e.g., 1112) to a second editing module (e.g., 1122), and provide scene information generated by the second editing module (e.g., 1122) to the first editing module (e.g., 1112), and scene information provided to the compositing engine 1140 (via the message server 1191) includes the scene information generated by the first editing module and the scene information generated by the second editing module.

In some embodiments, the editing application server 1193 is constructed to manage user account records (e.g., the user account record 1501 of FIG. 15) for registered users of the platform system 1170. In some embodiments, each user account record includes an account identifier, authorized projects, and information for stream keys of broadcast ingest servers that are registered for the user of the account record. In some embodiments, stream key information includes the stream key. In some embodiments, stream key information includes user credentials of the user for the associated broadcast ingest server, and the platform system 1170 is constructed to access the stream key from the broadcast ingest server by using the user credentials. In some embodiments, each user account record includes permissions for each authorized project for the user of the account record. In some embodiments, each user account record includes roles for each authorized project for the user of the account record (e.g., owner, collaborator).

Editing Module: Hardware

In some embodiments, at least one video editing module is a hardware module. In some embodiments, each video editing module is a hardware module. In some embodiments, at least one video editing module is a set of machine-executable instructions stored on a computer-readable medium and the user device that includes the video editing module includes at least one processing unit that is constructed to execute the machine-executable instructions of the module to perform the processes described herein. In some embodiments, each video editing module is a set of machine-executable instructions stored on a computer-readable medium and the user device that includes the video editing module includes at least one processing unit that is constructed to execute the machine-executable instructions of the module to perform the processes described herein.

Capture Module: Hardware

In some embodiments, at least one capture module is a hardware module. In some embodiments, each capture module is a hardware module. In some embodiments, at least one capture module is a set of machine-executable instructions stored on a computer-readable medium and the user device that includes the capture module includes at least one processing unit that is constructed to execute the machine-executable instructions of the module to perform the processes described herein. In some embodiments, each capture module is a set of machine-executable instructions stored on a computer-readable medium and the user device that includes the capture module includes at least one processing unit that is constructed to execute the machine-executable instructions of the module to perform the processes described herein.

Single User Device System

In some embodiments, a system (e.g., 1100) includes a first user device (e.g., 1110), a video production ingest server (e.g., 1130), and a compositing engine (e.g., 1140). In some embodiments, the first user device includes a first capture module (e.g., 1111) and a first video editing module (e.g., 1112). In some embodiments, the first capture module is constructed to, responsive to a first capture instruction, capture video data generated by a first video device of the first user device, generate a first video stream, and provide the first video stream to the video production ingest server, which is external to the first user device. In some embodiments, the first video editing module is constructed to provide the first capture instruction to the first capture module responsive to user input received by the first user device, and provide the compositing engine (which is external to the first user device) with first scene information of a first scene, wherein the first scene information includes at least information identifying the first video stream and information identifying a first asset. In some embodiments, the video production ingest server is constructed to receive the generated first video stream from the first capture module, provide the first video stream to the first video editing module, and provide the first video stream to the compositing engine. In some embodiments, the compositing engine is constructed to: generate a first composite live video stream that includes the first video stream and data of the first asset in accordance with the first scene information, responsive to a live broadcast instruction provided by the first video editing module, and provide the first composite live video stream to a broadcast ingest server (e.g., 1151) by using a stream key of the broadcast ingest server that is associated with a user of the first user device.

In some embodiments, the system is a multi-tenant video production system, the system is constructed to store first user stream key information for the broadcast ingest server in association with a first platform account, the video production ingest server is constructed to associate the first video stream with a first video project of the first platform account, and the first video editing module is authenticated to access the first video project.

Multi-User-Device System

In some embodiments, the system (e.g., 1100) includes a first user device (e.g., 1110), a second user device (e.g., 1120) a video production ingest server (e.g., 1130), and a compositing engine (e.g., 1140). In some embodiments, at least one of the first user device and the second user device includes a first capture module (e.g., 1111) and at least one of the first user device and the second user device includes a first video editing module (e.g., 1112). In some embodiments, the first capture module is constructed to, responsive to a first capture instruction, capture video data generated by a first video device, generate a first video stream, and provide the first video stream to the video production ingest server, which is external to the first user device and the second user device. In some embodiments, the first video editing module is constructed to provide the first capture instruction to the first capture module responsive to user input received by the one of the first user device and the second user device that includes the first video editing module, and provide the compositing engine (which is external to the first user device and the second user device) with first scene information of a first scene, wherein the first scene information includes at least information identifying the first video stream and information identifying a first asset. In some embodiments, the video production ingest server is constructed to receive the generated first video stream from the first capture module, provide the first video stream to one of the first video editing module and a second video editing module, and provide the first video stream to the compositing engine. In some embodiments, the compositing engine is constructed to: generate a first composite live video stream that includes the first video stream and data of the first asset in accordance with the first scene information, responsive to a live broadcast instruction provided by one of the first video editing module and the second video editing module, and provide the first composite live video stream to a broadcast ingest server (e.g., 1151) by using a stream key of the broadcast ingest server that is associated with a user of one of the first user device and the second user device. In some embodiments, the first video device is included in the first user device. In some embodiments, the first video device is included in the second user device. In some embodiments, the first video editing module is included in the first user device, and the second video editing module is included in the second user device. In some embodiments, the first video editing module is included in the second user device, and the second video editing module is included in the first user device. In some embodiments, the first capture module is included in the first user device. In some embodiments, the first capture module is included in the second user device.

In some embodiments, the system (e.g., 1100) is a multi-tenant and multi-user-device video production system, the system is constructed to store first user stream key information for the broadcast ingest server in association with a first platform account, the video production ingest server is constructed to associate the first video stream with a first video project of the first platform account, and the first video editing module is authenticated to access the first video project.

Methods

Figure 12A:
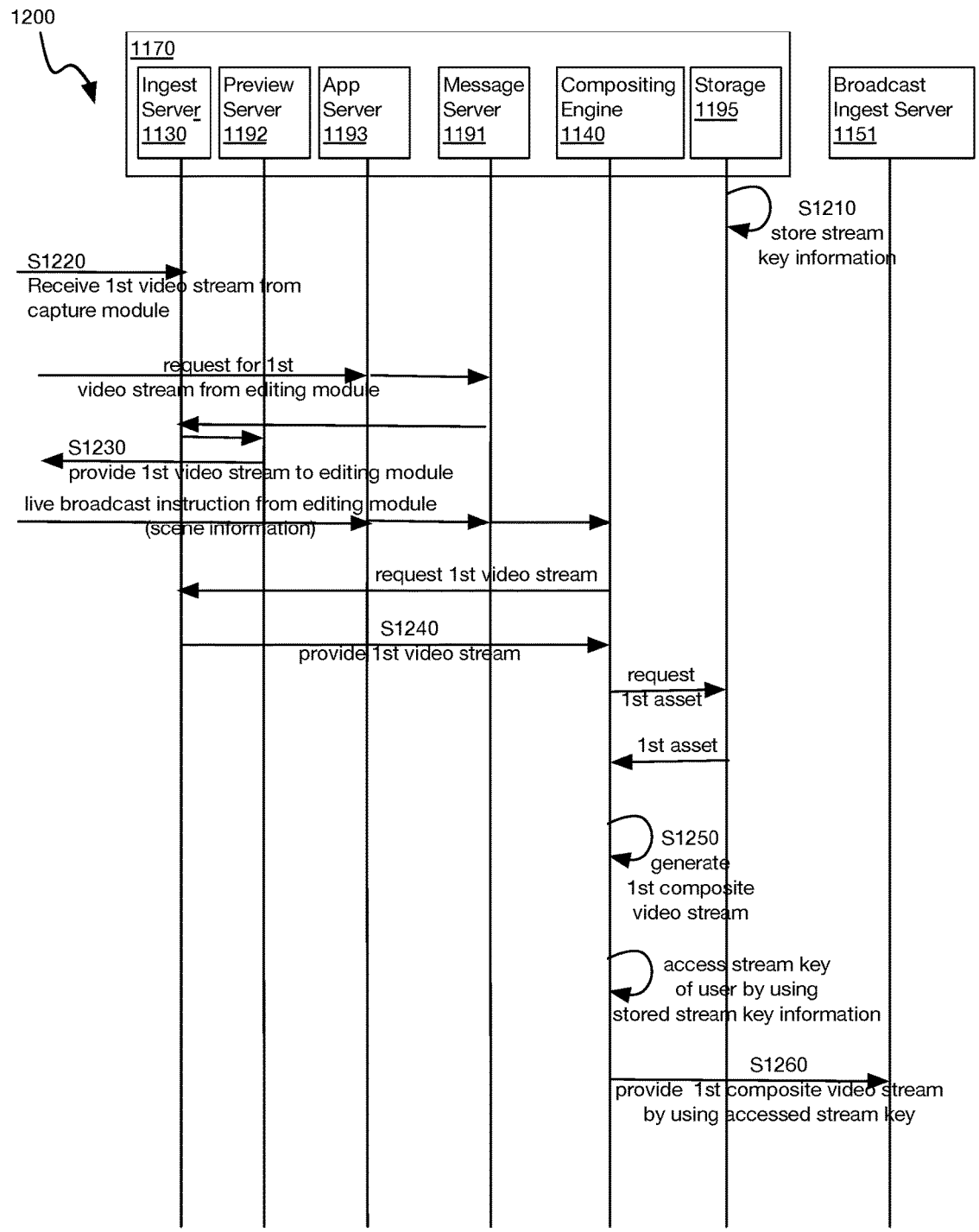
FIGS. 12A-B are sequence diagrams of methods, according to embodiments.
Figure 12B:
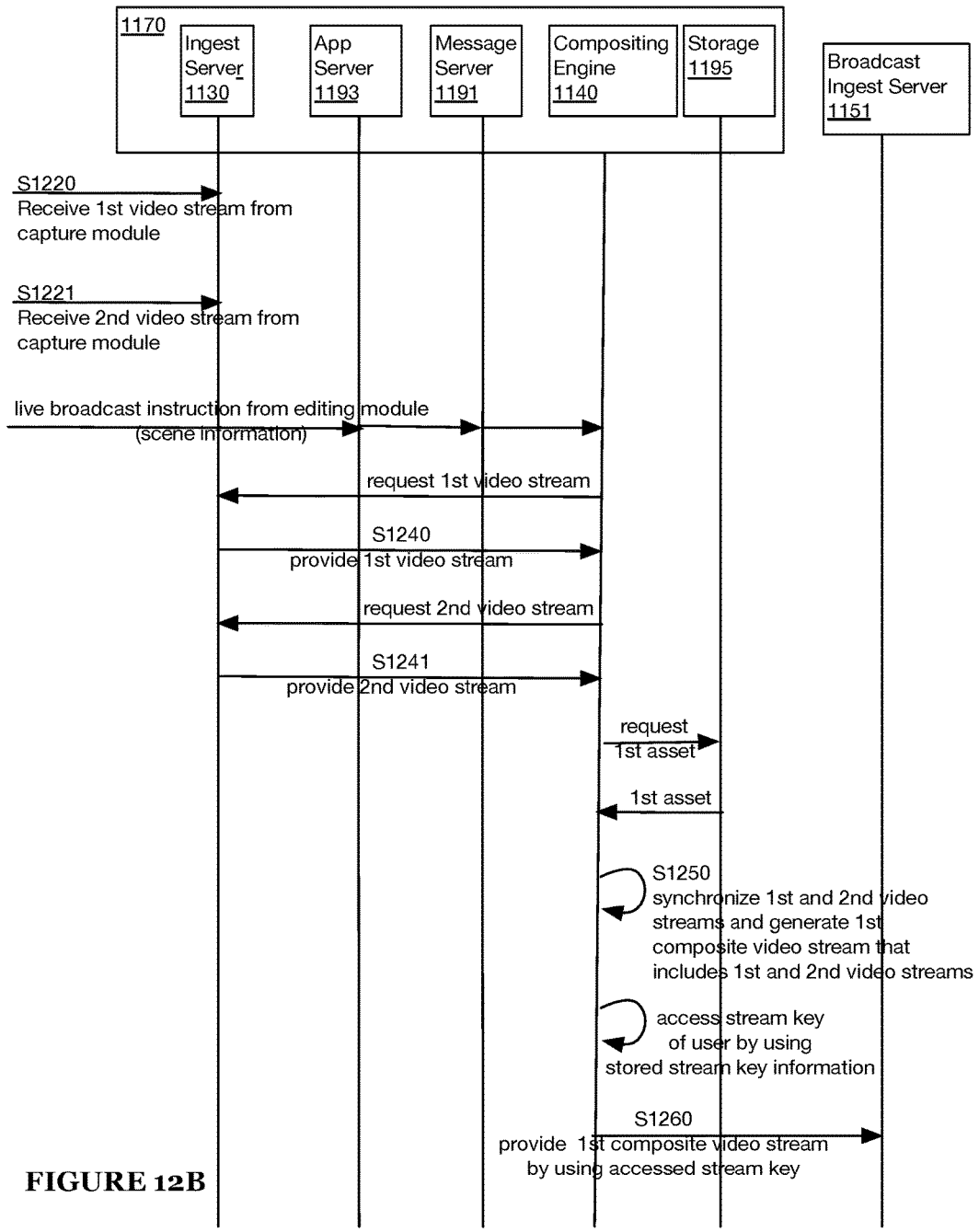
Figure 13:
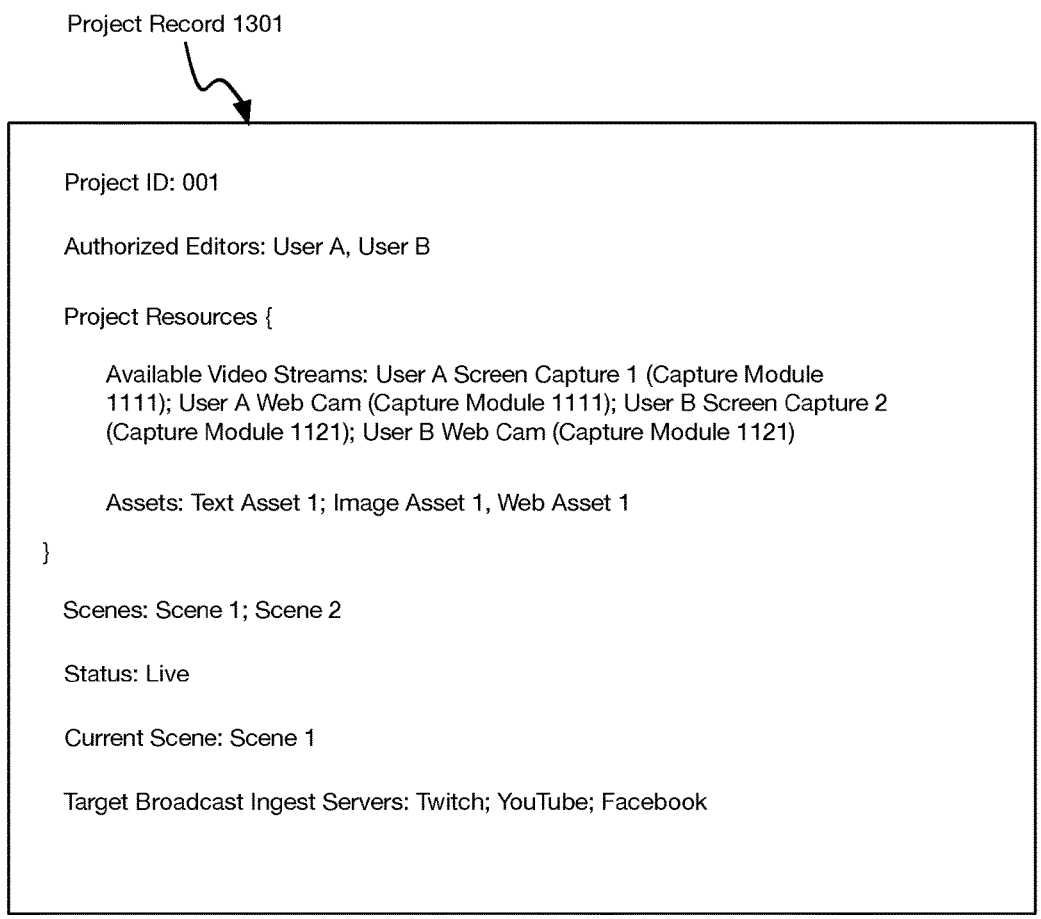
FIG. 13 is a diagram depicting an exemplary project record, according to embodiments.

FIGS. 12A-B are representations of a method 1200 in accordance with embodiments. In some embodiments, the method 1200 is performed by the video production platform system 1170. In some embodiments the platform system 1170 is a multi-tenant video production platform system. In some embodiments, the platform system 1170 is a multi-tenant collaborative video production platform system. The method 1200 includes: storing first user stream key information for a first broadcast ingest server (e.g., 1152 of FIG. 11A) in association with a first platform account (e.g., of account record 1501 of FIG. 15) (process S1210); a platform ingest server (e.g., 1130 of FIG. 11A) receiving a first video stream (e.g., video game screen capture, webcam video, and the like) from a first capture module (e.g., 1111 or 1121 of FIG. 11B) of a first user device, and associating the first video stream with a first video project (e.g., the project of FIG. 13) of the first platform account (process S1220); responsive to an instruction provided by a first editing module (e.g., 1112 or 1122 of FIG. 11B) authenticated to access the first video project, the platform ingest server providing the first video stream to the first editing module (process S1230); responsive to a broadcast instruction, the platform ingest server providing the first video stream to a compositing engine (e.g., 1140 of FIG. 11A) (process S1240); the compositing engine generating a first composite video stream that includes the first video stream and data of a first asset (e.g., an overlay, text asset, web asset, image asset, and the like) in accordance with first scene information provided by at least one of the first editing module (1112 of FIG. 11B) and a second editing module (1122 of FIG. 11B) authenticated to access the first video project (process S1250); and the compositing engine providing the first composite video stream to the first broadcast ingest server (e.g., 1152 of FIG. 11A) by using the first user stream key information (process S1260).

In some embodiments, the platform ingest server provides the first video stream to the first editing module indirectly via the preview server 1192 as shown in FIG. 12A. In some embodiments, the instruction requesting the first video stream is provided by the first editing module to an editing application server (e.g., 1193), the application server provides the instruction to a messaging server (e.g., 1191), the messaging server provides the instruction to the ingest server, and as a response to the instruction, the platform ingest server provides the first video stream to a preview server (e.g., 1192); the preview server provides the first video stream to the first editing module. In some embodiments, the platform ingest server provides the first video stream directly to the first editing module.

In some embodiments, the method 1200 includes: responsive to an instruction provided by a second editing module (e.g., 1122 of FIG. 12B) authenticated to access the first video project, the platform ingest server providing the first video stream to the second editing module. In some embodiments, the platform ingest server provides the first video stream to the second editing module indirectly via the preview server 1192. In some embodiments, the platform ingest server provides the first video stream directly to the second editing module. In some embodiments, the instruction for the first video stream is provided by the second editing module to the editing application server (e.g., 1193), the application server provides the instruction to the messaging server (e.g., 1191), the messaging server provides the instruction to the ingest server, and as a response to the instruction, the platform ingest server provides the first video stream to the preview server (e.g., 1192); the preview server provides the first video stream to the second editing module.

In some embodiments, the broadcast instruction is provided by an editing module of a user device (e.g., 1120) that is different from the user device (e.g., 1110) that includes the capture module that provides the first video stream. In some embodiments, the broadcast instruction is provided by an editing module (e.g., 1112) Of a user device (e.g., 1110), responsive to reception of user input received by the user device. In some embodiments, the user input received by the user device is user selection of an element of a graphical user interface displayed by the user device (e.g., user selection of the button 710 of FIG. 8).

In some embodiments, the first broadcast instruction is provided by one of the first editing module (e.g., 1112) and the second editing module (e.g., 1122). By virtue of the foregoing, multiple users can collaborate on a project, and either collaborator can start, stop, or update the broadcast. In some embodiments, either collaborator can start, stop, or update the broadcast by selection of an element (e.g., one of the elements 710 of FIGS. 8, 812 and 814 of FIG. 9, and 914 of FIG. 10) of a graphical user interface displayed by an editing module (e.g., 1112) of a user device (e.g., 1110). In some embodiments, the first capture module (e.g., 1111) generates the first video stream by capturing video data generated by a first video device of the first user device. In some embodiments, the first scene information is of a first scene, and the first scene information includes at least information identifying the first video stream and information identifying the first asset. In some embodiments, the first capture module generates the first video stream responsive to a first capture instruction. In some embodiments, the first editing module is external to the platform system. In some embodiments, the first editing module is included in one of the first user device external to the platform system and a second user device external to the platform system. In some embodiments, the editing module can be included in the same user device as the capture device, or in a different user device. In some embodiments, a user edits a project by using data captured by a remote user device. In some embodiments, the first editing module is associated with one of the first platform account and a second platform account authorized to access the first video project. In some embodiments, collaborators can use a same account, or each collaborator can have a different account.

In some embodiments, one of the first editing module (e.g., 1112), the second editing module (e.g., 1122), and a third editing module (e.g., 1184) authenticated to access the first video production project provides the first capture instruction responsive to received user input. In some embodiments, there are multiple editing modules collaborating on a project, and any one of these editors can issue the capture instruction.

In some embodiments, the platform system (e.g., 1170) provides first editing module scene information received from the first editing module (e.g., 1112) to the second editing module (e.g., 1122), the platform system provides second editing module scene information received from the second editing module (e.g., 1122) to the first editing module (e.g., 1112), and the first scene information includes the first editing module scene information and the second editing module scene information. In some embodiments, two editing modules (e.g., 1112 and 1122) can collaboratively edit a shared project, and edits made by one module are propagated to the other editing module so that both editing modules operate on the same scene.

In some embodiments, the first editing module (e.g., 1112) generates the first editing module scene information, and a display device (e.g., of the device 1110) of the first editing module displays a live scene that includes the first video stream provided by the platform ingest server (e.g., 1130), in accordance with the first editing module scene information and the second editing module scene information. In some embodiments, the platform ingest server provides the first video stream directly to the first editing module. In some embodiments, the platform ingest server provides the first video stream to the first editing module indirectly (as described herein). In some embodiments, the platform ingest server provides the first video stream to the first editing module indirectly via the preview server 1192 (e.g., as shown in FIG. 12A).

In some embodiments, the method 1200 includes the compositing engine (e.g., 1140) processing second scene information responsive to reception of a live update instruction received by the compositing engine. In some embodiments, even if a scene is changed by an editor, this change is off-line until a live update instruction is sent to the compositing engine.

In some embodiments, the first capture instruction is provided to the first capture module (e.g., 1111) via the platform system (e.g., 1170). In some embodiments, an editing module (e.g., 1122) controls a remote capture module (e.g., 1111) by sending a capture instruction to the platform system (e.g., 1170), and the platform system forwards the capture instruction to the remote capture module (e.g., 1111).

In some embodiments, the method 1200 includes: the video production ingest server (e.g., 1130) receiving a second video stream from a second capture module (e.g., 1121) of the second user device (e.g., 1120), and associating the second video stream with the first video project of the first platform account (process S1221 of FIG. 12B); the platform ingest server providing the second video stream to the first editing module (e.g., 1112), responsive to an instruction provided by the first editing module (e.g., 1112), wherein the first editing module is included in the first user device (e.g., 1110). In some embodiments, a single editing module (e.g., 1112) receives two video streams, e.g., game screen captures from two different players of a multi-player game.

In some embodiments, first scene information specifies the first video stream and the second video stream, and the method 1200 includes: the platform ingest server providing the second video stream to the compositing engine (e.g., the process S1241 of FIG. 12B); the compositing engine generating a first composite video stream that includes the first video stream, the second video stream and data of a first asset (e.g., an overlay, text asset, web asset, image asset, and the like) in accordance with first scene information (process S1250); and the compositing engine providing the first composite video stream to the first broadcast ingest server by using the first user stream key information (process S1260). In some embodiments, the process S1250 includes synchronizing the first video stream and the second video stream (e.g., S1250 of FIG. 12B).

In some embodiments, the method 1200 includes: the compositing engine generating the composite live video stream to include the first video stream, the second video stream, and data of the first asset. In some embodiments, the composite live stream includes two video streams, e.g., game screen captures from two different players of a multi-player game.

In some embodiments, the first user device (e.g., 1110) provides the stream key to the video production platform system 1170. In some embodiments, the second user device (e.g., 1120) provides the stream key to the video production platform system 1170. In some embodiments, the video production platform system 1170 stores the stream key in a storage (e.g., 1195), and the compositing engine accesses the stream key from the storage. In some embodiments, the video production platform system 1170 receives the stream key during a user registration process.

In some embodiments, the stream key is constructed to authenticate an incoming video stream received at a broadcast ingest server (e.g., 1151, 1152) with a user of a broadcast platform that includes the broadcast ingest server. In some embodiments, an RTP stream is assigned to a user of the broadcast platform. In some embodiments, a numerical port on the broadcast ingest server is assigned to a user of the broadcast platform, and the stream key specifies the numerical port.

In some embodiments, the method 1200 includes a preview server of the platform system (e.g., the preview server 1192) providing the first editing module (e.g., 1112) with a notification indicating that the first video stream is available for retrieval from the platform ingest server, responsive to receiving a notification from the platform ingest server. In some embodiments, the platform ingest server provides the notification to the preview server responsive to receiving the first video stream from the first capture module (e.g., 1111). In some embodiments, the first editing module (e.g., 1111) provides the instruction to retrieve the first video stream responsive to the notification provided by the preview server.

In some embodiments, the method 1200 includes an application server (e.g., 1193) of the platform system providing the first editing module (e.g., 1111) with a notification indicating that the first video stream is available for retrieval from the platform ingest server, responsive to receiving a notification from the platform ingest server. In some embodiments, the platform ingest server provides the notification to the application server responsive to receiving the first video stream from the first capture module (e.g., 1111). In some embodiments, the first editing module (e.g., 1111) provides the instruction to retrieve the first video stream responsive to the notification provided by the application server. In some embodiments, the application server receives the notification indirectly from the platform ingest server. In some embodiments, the platform ingest server provides the notification to the preview server (e.g., 1192) and the preview server provides the notification to the application server. In some embodiments, the notification indicates that the first video stream is available for retrieval indirectly from the platform ingest server via the preview server.

Collaborative Editing

In some embodiments, the application server 1193 is constructed to enable collaborative editing of a shared project by multiple editing modules (e.g., 1112, 1122, 1184). In some embodiments, the application server 1193 is constructed to propagate edits made by a first editing module (e.g., 1112) to a second editing module (e.g., 1122) so that both editing modules operate on the same scene. In some embodiments, the application server 1193 is constructed to provide first editing module scene information received from the first editing module (e.g., 1112) to the second editing module (e.g., 1122), the application server 1193 is constructed to provide second editing module scene information received from the second editing module to the first editing module, and the first scene information includes the first editing module scene information and the second editing module scene information. By virtue of the foregoing, remotely located users can collaboratively edit a video for a live broadcast stream by using respective editing modules that are communicatively coupled to the platform system 1170.

Off-Line Editing

In some embodiments, edits to scene information are not propagated to the compositing engine 1140 until an editing module (e.g., 1112, 1122) provides an update instruction to the compositing engine 1140.

In some embodiments, during a live broadcast of the first composite video stream to a broadcast ingest server, the platform ingest server 1130 provides editing modules (that have access to the video project being broadcasted) with at least one video stream being used in the first composite video stream; each such editing module is constructed to display the received video stream along with updated assets that are not included in the first composite video stream. In other words, an editing module can display a live video stream that is being broadcasted by the compositing engine and receive user input to edit scene information without changing the scene of the first composite video stream. By virtue of the foregoing, off-line editing of a video project can be provided during live broadcasting. In some embodiments, the platform ingest server provides editing modules with the video stream being used in the composite video stream indirectly via the preview server 1192 as described herein (e.g., as shown in FIG. 12A). In some embodiments, the platform ingest server provides the video stream directly to the editing modules.

In some embodiments, during broadcasting of the first composite video stream, at least one editing module generates scene information of a second scene and scene information of a third scene, and the platform system 1700 stores the scene information of the first scene and the scene information of the second scene. In some embodiments, an editing module provides an update instruction to the compositing engine (either directly or via one or more of the application server 1193 and the message server 1191), and the update instruction specifies one of the second scene information and the third scene information. By virtue of the foregoing, scene information for multiple scenes can be generated off-line, and during broadcasting of the composite video stream, information of a selected scene is provided to the compositing engine.

For example, a user of a first editing module can create two scenes by using the editing module. One of the editing module and the platform system 1170 stores the information for the two scenes. During the live broadcast, the user selects one of the first scene and the second scene (e.g., by selecting one of the user interface elements 816 and 818 of FIG. 9), and responsive to the user selection, the editing module controls the platform system 1170 to provide the information of the selected scene to the compositing engine. In some embodiments, the user creates new scenes during the live broadcasting (e.g., by selecting the user interface element 820 of FIG. 9), and updates the live broadcast to incorporate a selected new scene by providing a scene update instruction (e.g., by selecting the user interface element 812 of FIG. 9).

Add Server

In some embodiments, the compositing engine generating the first composite video stream (the process S1250) includes: including advertising units (e.g., advertising assets) in the first composite video stream. In some embodiments, the compositing engine includes advertising units as described herein for FIG. 4.

In some embodiments, the compositing engine (e.g., 1140) receives metadata, including tracking data, statistics on live stream events and triggers for serving and displaying digital advertising units within a live digital content stream. In some embodiments, a third-party platform ad server (e.g., 306 of FIG. 4) is constructed to send advertising units directly to the compositing engine for adding to the first composite video stream to be output to the broadcast ingest servicer (e.g., 1151).

In some embodiments, a native ad server (e.g., 308 of FIG. 4) is constructed to send advertising units directly to the compositing engine for adding to the first composite video stream to be output to the broadcast ingest servicer (e.g., 1151).

By virtue of the foregoing, digital advertising units can be composited directly into an outgoing composite digital content stream from the compositing engine, so that digital advertising units cannot be blocked by a third-party web browser plugin being installed on a web browser of a recipient viewer (e.g., a video consuming device 1161-1166 of FIG. 11A).

In some embodiments, the native ad server sends and receives metadata, including tracking data, statistics on live stream events and triggers for serving and displaying advertising units within a live digital content stream and sends digital advertising units directly to the compositing engine.

By virtue of the foregoing, digital advertising units can be composited directly into an outgoing composite digital content stream from the compositing engine, so that digital advertising units cannot be blocked by a third-party web browser plugin being installed on a web browser of a recipient viewer (e.g., a video consuming device 1161-1166 of FIG. 11A).

In some embodiments, the platform system 1170 is constructed allow specific digital advertising units from the third-party platform ad server or the native ad server to be triggered automatically given signals received from the compositing engine based on a variety of factors such as the current live digital content stream(s) being received by the compositing engine, the live digital content stream metadata such as titles, descriptions, etc., or based on a predefined frequency.

In some embodiments, the first composite video stream is constructed to be made clickable by a recipient viewer of the first composite video stream by using recognition logic of a digital content stream player of a video consuming device (e.g., 1161-1166). In some embodiments, special notifications or instructions are sent from the compositing engine to the digital content stream player of the video consuming device to provide timing and digital advertising unit information such as a region or regions of a digital video content stream to make clickable, hyperlink information to navigate to in a web browser for when a link is clicked, product/service information on the product/service contained in the digital advertising unit, and the like.

Multi-User Game Streaming

In some embodiments, a first capture module (e.g., 1111) provides a video stream (to the platform ingest server 1130) that includes screen capture of game display output for a first user of a video game, and a second capture module (e.g., 1121) provides a video stream (to the platform ingest server 1130) that includes screen capture of game display output for a second user of a video game, and the compositing engine generates a single composite video stream that includes video of the first player and video of the second player. In some embodiments, a first capture module (e.g., 1111) provides a video stream (to the platform ingest server 1130) that includes web cam video a first user of a video game, and a second capture module (e.g., 1121) provides a video stream (to the platform ingest server 1130) that includes web cam video of a second user of a video game, and the compositing engine generates a single composite video stream that includes web cam video of the first player and web cam video of the second player.

System Architecture: Platform System

Figure 16:
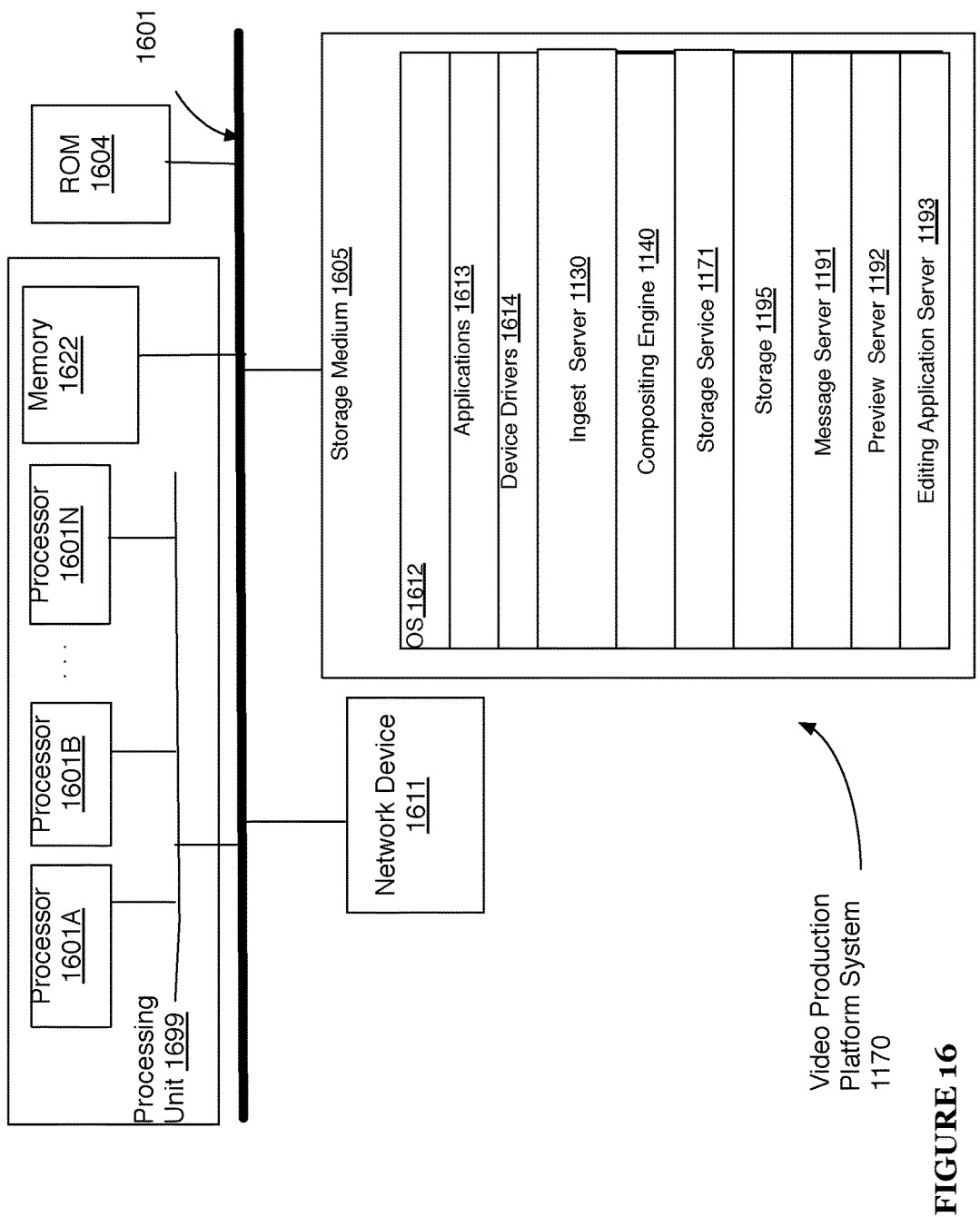
FIG. 16 is a diagram depicting system architecture of a video production platform system, according to embodiments.

FIG. 16 is a diagram depicting system architecture of a video production platform system, according to embodiments. FIG. 16 is an architecture diagram of a system (e.g., video production platform system 1170 of FIG. 11A) according to an embodiment in which the platform system is implemented by a server device. In some embodiments, the platform system is implemented by a plurality of devices.

In some embodiments, the platform system is implemented by a server device that includes machine-executable instructions (and related data) for the platform ingest server 1130, the compositing engine 1140, the storage service 1171, the storage 1195, the message server 1191, the preview server 1192, and the editing application server 1193.

In some embodiments, the platform system is implemented by a plurality of devices, and the plurality of devices include machine-executable instructions (and related data) for the platform ingest server 1130, the compositing engine 1140, the storage service 1171, the storage 1195, the message server 1191, the preview server 1192, and the editing application server 1193.

The bus 1601 interfaces with the processors 1601A-1601N, the main memory (e.g., a random access memory (RAM)) 1622, a read only memory (ROM) 1604, a processor-readable storage medium 1605, and a network device 1611. In some embodiments, the platform system includes at least one of a display device and a user input device.

The processors 1601A-1601N may take many forms, such as ARM processors, X86 processors, X64 processors, AMD64 processors, and the like.

In some embodiments, the platform system includes at least one of a central processing unit (processor) and a multi-processor unit (MPU).

The processors 1601A-1601N and the main memory 1622 form a processing unit 1699. In some embodiments, the processing unit includes one or more processors communicatively coupled to one or more of a RAM module, a ROM module, and machine-readable storage medium; the one or more processors of the processing unit receive instructions stored by the one or more of a RAM module, a ROM module, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes a GPU (Graphics Processing Unit). In some embodiments, the processing unit is a GPU (Graphics Processing Unit). In some embodiments, the processing unit is an FPGA (Field Programmable Gate Array). In some embodiments, the processing unit includes one or more of an platform ingest server (e.g., 1130), a compositing engine (e.g., 1140), a storage service (e.g., 1171), a storage (e.g., 1195), a message server (e.g., 1191), a preview server (e.g., 1192), and an editing application server (e.g., 1193).

The network device 1611 provides one or more wired or wireless interfaces for exchanging data and commands between the platform system and other devices, such as a user device (e.g., 1110) and a broadcast ingest server (e.g., 1151). Such wired and wireless interfaces include, for example, a universal serial bus (USB) interface, Bluetooth interface, an optical interface, Wi-Fi interface, cellular network interface, GSM network interface, Ethernet interface, near field communication (NFC) interface, and the like.

Machine-executable instructions in software programs (such as an operating system, application programs, and device drivers) are loaded into the memory 1622 (of the processing unit 1699) from the processor-readable storage medium 1605, the ROM 1604 or any other storage location. During execution of these software programs, the respective machine-executable instructions are accessed by at least one of processors 1601A-1601N (of the processing unit 1699) via the bus 1601, and then executed by at least one of processors 1601A-1601N. Data used by the software programs are also stored in the memory 1622, and such data is accessed by at least one of processors 1601A-1601N during execution of the machine-executable instructions of the software programs. The processor-readable storage medium 1605 is one of (or a combination of two or more of) a hard drive, a flash drive, a DVD, a CD, an optical disk, a floppy disk, a flash storage module, a solid state drive, a ROM module, an EEPROM module, an electronic circuit, a semiconductor memory device, and the like. In some embodiments, the processor-readable storage medium 1605 includes machine-executable instructions (and related data) for an operating system 1612, software programs 1613, device drivers 1614, the platform ingest server 1130, the compositing engine 1140, the storage service 1171, the storage 1195, the message server 1191, the preview server 1192, and the editing application server 1193.

System Architecture: User Device

Figure 17:
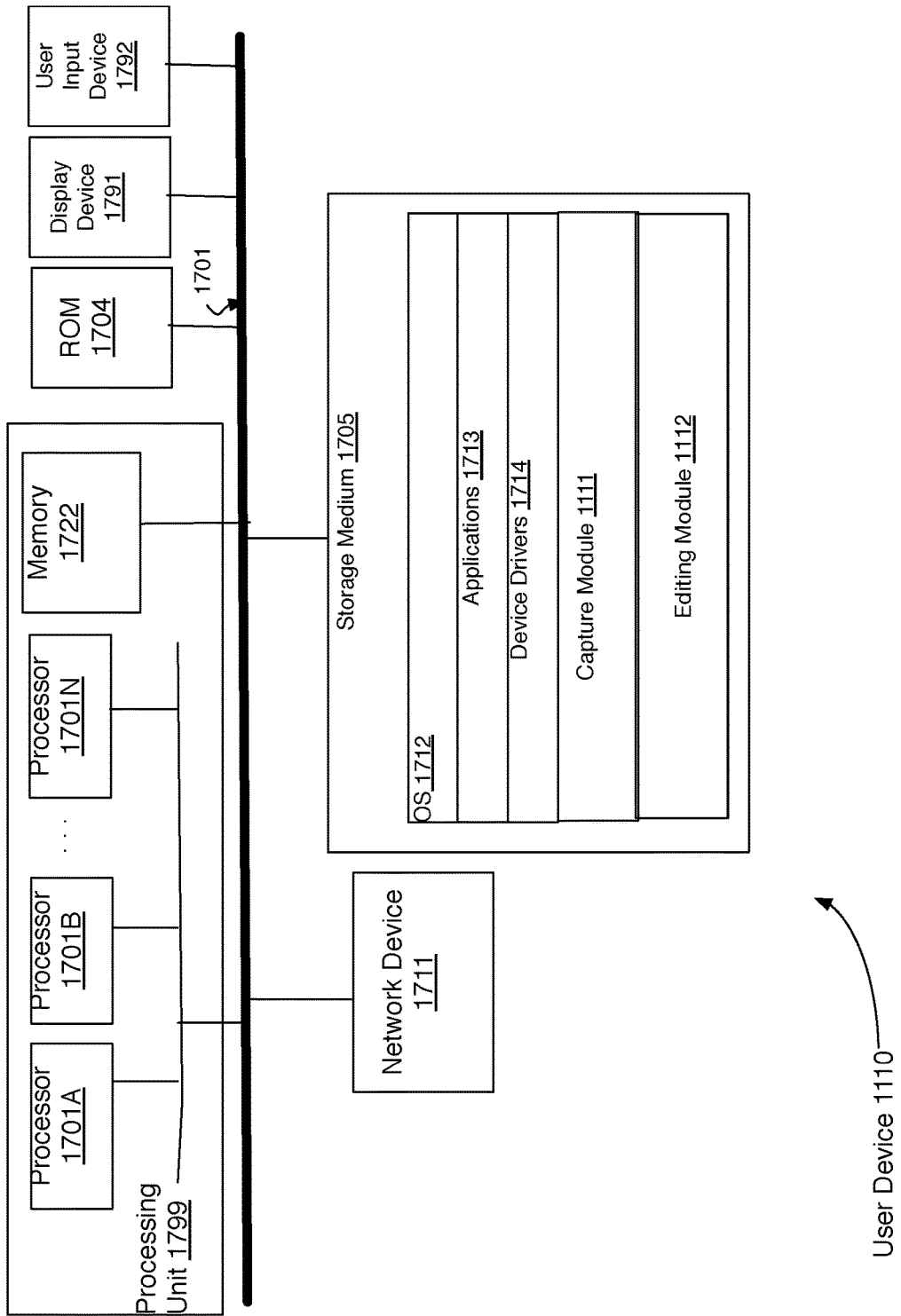
FIG. 17 is a diagram depicting system architecture of a user device, according to embodiments.

FIG. 17 is an architecture diagram of a user device (e.g., 1110 of FIG. 11A) according to some embodiments.

The bus 1701 interfaces with the processors 1701A-1701N, the main memory (e.g., a random access memory (RAM)) 1722, a read only memory (ROM) 1704, a processor-readable storage medium 1705, and a network device 1711. In some embodiments, the user device includes at least one of a display device 1791 and a user input device 1792.

The processors 1701A-1701N may take many forms, such as ARM processors, X86 processors, X64 processors, AMD64 processors, and the like.

In some embodiments, the user device includes at least one of a central processing unit (processor) and a multi-processor unit (MPU).

The processors 1701A-1701N and the main memory 1722 form a processing unit 1799. In some embodiments, the processing unit includes one or more processors communicatively coupled to one or more of a RAM module, a ROM module, and machine-readable storage medium; the one or more processors of the processing unit receive instructions stored by the one or more of a RAM module, a ROM module, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes a GPU. In some embodiments, the processing unit is a GPU. In some embodiments, the processing unit is an FPGA. In some embodiments, the processing unit includes one or more of a capture module (e.g., 1111) and an editing module (e.g., 1112). The network device 1711 provides one or more wired or wireless interfaces for exchanging data and commands between the user device and other devices, such as a video production platform system (e.g., 1170). Such wired and wireless interfaces include, for example, a universal serial bus (USB) interface, Bluetooth interface, an optical interface, Wi-Fi interface, cellular network interface, GSM network interface, Ethernet interface, near field communication (NFC) interface, and the like.

In some embodiments, machine-executable instructions in software programs (such as an operating system, application programs, and device drivers) are loaded into the memory 1722 (of the processing unit 1799) from the processor-readable storage medium 1705, the ROM 1704 or any other storage location. During execution of these software programs, the respective machine-executable instructions are accessed by at least one of processors 1701A-1701N (of the processing unit 1799) via the bus 1701, and then executed by at least one of processors 1701A-1701N. Data used by the software programs are also stored in the memory 1722, and such data is accessed by at least one of processors 1701A-1701N during execution of the machine-executable instructions of the software programs.

In some embodiments, the processing unit is a GPU, and the GPU executes the machine-executable instructions of the capture module 1111. In some embodiments, the processing unit includes a GPU, and the GPU executes the machine-executable instructions of the capture module 1111. In some embodiments, the user device includes a GPU, and the GPU executes the machine-executable instructions of the capture module 1111.

The processor-readable storage medium 1705 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. In some embodiments, the processor-readable storage medium 1705 includes machine-executable instructions (and related data) for an operating system 1712, software programs 1713, device drivers 1714, the capture module 1111 and the editing module 1112.

Machines

The systems and methods of some embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

CONCLUSION

As a person skilled in the art will recognize from the previous detailed description and from the figures and claims, modifications and changes can be made to the embodiments disclosed herein without departing from the scope defined in the claims.

What is claimed is:

1. A method comprising: at a multi-tenant video production platform system:
   storing first user stream key information for a first broadcast ingest server in association with a first platform account;
   a platform ingest server receiving a first video stream from a first capture module of a first user device, and associating the first video stream with a first video project of the first platform account;

the platform ingest server receiving a second video stream from a second capture module of a second user device, and associating the second video stream with the first video project of the first platform account;

the platform ingest server providing the first video stream and the second video stream to a first editing module of the first user device, wherein the first editing module is authenticated to access the first video project;

receiving first scene information from the first editing module of the first user device, wherein the first scene information specifies: a first asset, positional information of the first asset, positional information of the first video stream, and positional information of the second video stream; and responsive to a broadcast instruction received from the first editing module of the first user device by the platform system:

the platform ingest server providing the first video stream and the second video stream to a compositing engine of the platform system;

the compositing engine generating a first composite video stream that includes the first video stream, the second video stream, and data of the specified first asset, wherein the compositing engine generates the first composite video stream in accordance with the received first scene information; and the compositing engine providing the first composite video stream to the first broadcast ingest server by using the first user stream key information.

2. The method of claim 1,
wherein the broadcast instruction is provided by the first editing module,
wherein the first capture module generates the first video stream by capturing video data generated by a first video device of the first user device,
wherein the first scene information is of a first scene,
wherein the first capture module generates the first video stream responsive to a first capture instruction;
wherein the first editing module is external to the platform system;
wherein the first editing module is associated with the first platform account.

3. The method of claim 2, wherein the first editing module provides the first capture instruction responsive to received user input.

4. The method of claim 3,
wherein the platform system provides the first scene information received from the first editing module of the first user device to a second editing module of the second user device,
wherein the platform system provides first scene information received from the second editing module of the second user device to the first editing module of the first user device, and
wherein the compositing engine generates the first composite video stream in accordance with the first scene information received from the first editing module and the first scene information received from the second editing module.

5. The method of claim 4,
wherein the first editing module generates the first scene information that is received by the platform system from the first editing module, and
wherein a display device of the first editing module displays a live scene that includes the first video stream and the second video stream provided by the platform ingest server, in accordance with the first scene information generated by the first editing module and the second scene information received by the platform system from the second editing module.

6. The method of claim 5, further comprising:
the compositing engine processing second scene information responsive to reception of a live update instruction received by the compositing engine, and
wherein the first capture instruction is provided to the first capture module via the platform system.

7. The method of claim 6,
wherein the platform ingest server providing the first video stream to the first editing module comprises:
the platform ingest server providing the first video stream to a preview server; and
the preview server providing the first video stream to the first editing module, and
wherein the platform ingest server providing the first video stream to the compositing engine comprises:
the compositing engine providing a request for the first video stream to the platform ingest server responsive to the broadcast instruction; and
the platform ingest server providing the first video stream to the compositing engine as a response to the request from the compositing engine.

8. A video production system comprising:
at least one processing unit constructed to execute machine-executable instructions of at least one storage medium of the video production system; and
the at least one storage medium, wherein the at least one storage medium stores machine-executable instructions for controlling the video production system to:
store first user stream key information for a first broadcast ingest server in association with a first platform account;
receive, at a platform ingest server of the video production system, a first video stream from a first capture module of a first user device, and associate the first video stream with a first video project of the first platform account;
receive, at the platform ingest server, a second video stream from a second capture module of a second user device, and associate the second video stream with the first video project of the first platform account;
provide the first video stream and the second video stream to a first editing module of the first user device by using the platform ingest server, wherein the first editing module is authenticated to access the first video project;
receive first scene information from the first editing module of the first user device, wherein the first scene information specifies: a first asset, positional information of the first asset, positional information of the first video stream, and positional information of the second video stream; and
responsive to a broadcast instruction received from the first editing module of the first user device by the video production system:
provide the first video stream and the second video stream to a compositing engine of the video production system by using the platform ingest server;
use the compositing engine to generate a first composite video stream that includes the first video stream, the second video stream, and data of the specified first asset, wherein the compositing engine generates the first composite video stream in accordance with the received first scene information; and use the compositing engine to provide the first composite video stream to the first broadcast ingest server by using the first user stream key information, wherein the video production system is a multi-tenant video production platform system.

9. The method of claim 1, wherein the first editing module generates the first scene information responsive to user input received by the first user device.

10. The method of claim 1, wherein the first asset is a text asset.

11. The method of claim 1, wherein the first asset is a web asset.

12. The method of claim 1, wherein the first asset is an image asset.

13. The method of claim 1, wherein the first scene information includes first asset instructions.

14. The method of claim 1, wherein the first scene information includes track routing instructions.

15. The method of claim 1, wherein the first scene information includes text color instructions.

16. The method of claim 1, wherein the first scene information includes font instructions.

17. The method of claim 1, wherein the first scene information includes sizing instructions.

18. The method of claim 1, wherein the first scene information includes code injection instructions.

19. The method of claim 1, wherein the first scene information includes transition instructions.

20. The method of claim 1, wherein the first scene information includes web-filter instructions.

* * * * *